(12) United States Patent
Chen et al.

(10) Patent No.: US 12,052,443 B2
(45) Date of Patent: Jul. 30, 2024

(54) LOOP FILTERING METHOD AND APPARATUS

(71) Applicant: HUAWEI TECHNOLOGIES CO., LTD., Guangdong (CN)

(72) Inventors: Xu Chen, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 18/063,955

(22) Filed: Dec. 9, 2022

(65) Prior Publication Data

US 2023/0209096 A1 Jun. 29, 2023

Related U.S. Application Data

(63) Continuation of application No. PCT/CN2021/098251, filed on Jun. 4, 2021.

(30) Foreign Application Priority Data

Jun. 10, 2020 (CN) .......................... 202010525274.8
Sep. 27, 2020 (CN) .......................... 202011036512.5

(51) Int. Cl.
*H04N 19/82* (2014.01)
*H04N 19/176* (2014.01)
(Continued)

(52) U.S. Cl.
CPC ........... *H04N 19/82* (2014.11); *H04N 19/176* (2014.11); *H04N 19/186* (2014.11); *H04N 19/88* (2014.11)

(58) Field of Classification Search
CPC .. H04N 19/117; H04N 19/124; H04N 19/176; H04N 19/182; H04N 19/186; H04N 19/82; H04N 19/88
See application file for complete search history.

(56) References Cited

U.S. PATENT DOCUMENTS

2020/0244277 A1* 7/2020 Moue .................. H03M 1/0648

FOREIGN PATENT DOCUMENTS

| CN | 107925762 A | 4/2018 |
|----|-------------|--------|
| CN | 111133756 A | 5/2020 |

(Continued)

OTHER PUBLICATIONS

Bao Yao, Convolutional Neural Network Filter (CNNF) for Intra Frame, NET-N0169, Mar. 27, 2019, 9 pages.
(Continued)

*Primary Examiner* — Md N Haque

(57) ABSTRACT

A loop filtering method and apparatus are provided. The method includes: obtaining a first pixel matrix, where a value of a pixel at a corresponding location in the first pixel matrix corresponds to a luminance value of a pixel at a corresponding location in a first picture block; obtaining a second pixel matrix, where a pixel at a corresponding location in the second pixel matrix corresponds to a quantization step value corresponding to the luminance value of the pixel at the corresponding location in the first picture block; performing filtering processing on an input pixel matrix by using a filtering network to obtain an output pixel matrix, where the filtering network is a neural network that has a filtering function and is obtained through training, the output pixel matrix includes a third pixel matrix. Thus, filtering effect can be improved for reconstructed pictures of various quality levels.

21 Claims, 20 Drawing Sheets

(51) Int. Cl.
*H04N 19/186* (2014.01)
*H04N 19/88* (2014.01)

(56) References Cited

FOREIGN PATENT DOCUMENTS

| CN | 111194555 A | * | 5/2020 | ........... G06N 3/0454 |
|----|-------------|---|--------|-------------------------|
| CN | 111194555 A | | 5/2020 | |
| WO | WO-2020177133 A1 | * | 9/2020 | ........... H04N 19/117 |

OTHER PUBLICATIONS

Office Action issued in CN202011036512.5, dated Sep. 27, 2022, 14 pages.

* cited by examiner

Two-dimensional matrix input to a neural network

LOOP FILTERING METHOD AND APPARATUS

CROSS-REFERENCE TO RELATED APPLICATIONS

This application is a continuation of International Application No. PCT/CN2021/098251, filed on Jun. 4, 2021, which claims priority to Chinese Patent Application No. 202010525274.8, filed on Jun. 10, 2020 and Chinese Patent Application No. 202011036512.5, filed on Sep. 27, 2020. All of the aforementioned patent applications are hereby incorporated by reference in their entireties.

TECHNICAL FIELD

Embodiments of the present invention relate to the field of artificial intelligence (AI)-based video or picture compression technologies, and in particular, to a loop filtering method and apparatus.

BACKGROUND

Video coding (video encoding and decoding) is used in a wide range of digital video applications, for example, broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communication network with limited bandwidth capacity. Thus, video data is generally compressed before being communicated across modern day telecommunication networks. The size of a video could also be an issue when the video is stored on a storage device because memory resources may be limited. Video compression devices often use software and/or hardware at the source to code the video data prior to transmission or storage, thereby decreasing the amount of data needed to represent digital video pictures. The compressed data is then received at the destination by a video decompression device. With limited network resources and ever increasing demands of higher video quality, improved compression and decompression techniques that improve compression ratio with little to no sacrifice in picture quality are desirable.

In recent years, deep learning is gaining popularity in the fields of picture and video encoding and decoding. In a video encoder and a video decoder that use a hybrid architecture, coding distortion such as blocking effect and ringing effect in a reconstructed picture may be removed by using a loop filtering module. In a related technology, a filtering function of the loop filtering module is implemented by using a neural network, and filtering processing is further performed on reconstructed picture information or reconstructed picture block information input to the neural network, to obtain a filtered reconstructed picture or reconstructed picture block. However, this method cannot achieve good filtering effect for input pictures or picture blocks of different quality levels.

SUMMARY

This application provides a loop filtering method and apparatus, to improve filtering effect for reconstructed pictures of various quality levels.

The foregoing and other objectives are achieved by the subject matter of the independent claims. Further implementations are apparent from the dependent claims, the description and the figures.

Particular embodiments are outlined in the attached independent claims, with other embodiments in the dependent claims.

According to a first aspect, this application relates to a loop filtering method. The method is performed by a loop filter in an encoder or a decoder. The method includes:

obtaining a first pixel matrix, where an element at a corresponding location in the first pixel matrix corresponds to a luminance value of a pixel at a corresponding location in a first picture block, and the first picture block is a reconstructed picture block or a picture block in a reconstructed picture: obtaining a second pixel matrix, where an element at a corresponding location in the second pixel matrix corresponds to a quantization step value corresponding to the luminance value of the pixel at the corresponding location in the first picture block, and a size of the second pixel matrix is equal to a size of the first pixel matrix: and performing filtering processing on an input pixel matrix by using a filtering network to obtain an output pixel matrix. The filtering network is a neural network that has a filtering function and that is obtained through training. The output pixel matrix includes a third pixel matrix. An element at a corresponding location in the third pixel matrix corresponds to a luminance value or a luminance residual value of a pixel at a corresponding location in a second picture block. The second picture block is a picture block obtained after filtering is performed on the first picture block. The input pixel matrix is related to at least the first pixel matrix and the second pixel matrix.

A picture block (for example, the first picture block) may be understood as a pixel matrix X. An element at a corresponding location in the pixel matrix X may be understood as a pixel (or a pixel value, for example, the pixel value includes a luminance value of the pixel or a chroma value of the pixel) at a corresponding location in the picture block. In an example, a size of the picture block is 64×64, which indicates that pixels of the picture block are distributed in 64 rows×64 columns, and x(i, j) represents a pixel (or a pixel value) in an $i^{th}$ row and a $j^{th}$ column in the picture block. Correspondingly, an input pixel matrix A includes 64 rows and 64 columns, and there are 64×64 elements in total. A(i, j) represents an element in an $i^{th}$ row and a $j^{th}$ column in the pixel matrix A. A(i, j) corresponds to x(i, j) (for example, A(i, j) represents a value of the pixel x(i, j)). An element at a corresponding location in the input pixel matrix A corresponds to (for example, represents) a luminance value of the pixel at the corresponding location in the picture block, that is, indicates that a value of the element A(i, j) is a luminance value of the pixel x(i, j). Optionally, in another example, the element at the corresponding location in the input pixel matrix A may alternatively correspond to (for example, represent) another value of the pixel at the corresponding location in the picture block, that is, the value of the element A(i, j) may be another value of the pixel x(i, j), for example, a quantization step value corresponding to the luminance value of the pixel x(i, j); for another example, a chroma value of the pixel x(i, j); for another example, a quantization step value corresponding to the chroma value of the pixel x(i, j); for another example, a luminance residual value of the pixel x(i, j); for another example, a chroma residual value of the pixel x(i, j). This is not specifically limited in this application. It should be understood that when the element at the corresponding location in the input pixel matrix A represents the luminance value of the pixel at the corresponding location in the picture block, the input pixel matrix A is an example of the foregoing first pixel matrix. Alternatively, when the element at the corresponding location in the input pixel matrix A represents the quantization step value corresponding to the luminance value of the pixel at the corresponding location in the picture block, the input pixel matrix A is an example of the foregoing second pixel matrix. It should be understood that when the element at the corresponding location in the input pixel matrix A represents the chroma value of the pixel at the corresponding location in the picture block, the input pixel matrix A is an example of a fifth pixel matrix. Alternatively, when the element at the corresponding location in the input pixel matrix A represents the quantization step value corresponding to the chroma value of the pixel at the corresponding location in the picture block, the input pixel matrix A is an example of a sixth pixel matrix.

Similarly, an output pixel matrix B output by the filtering network corresponds to a filtered picture block (for example, the second picture block), that is, an element B(i, j) in the output pixel matrix corresponds to a pixel y(i, j) in the filtered picture block. In an example, a value of the element B(i, j) may represent a luminance value of the pixel y(i, j). Optionally, in another example, an element at a corresponding location in the pixel matrix B may alternatively correspond to (for example, represent) another value of a pixel at a corresponding location in the filtered picture block, that is, a value of the element B(i, j) may be another value of the pixel y(i, j), for example, a luminance residual value of the pixel y(i, j); for another example, a chroma value of the pixel y(i, j); for another example, a chroma residual value of the pixel y(i, j). This is not specifically limited in this application. It should be understood that when the element at the corresponding location in the output pixel matrix B represents the luminance value of the pixel at the corresponding location in the filtered picture block, the output pixel matrix B is an example of the third pixel matrix. Alternatively, when the element at the corresponding location in the output pixel matrix B represents the luminance residual value of the pixel at the corresponding location in the filtered picture block, the output pixel matrix B is another example of the third pixel matrix. It should be understood that when the element at the corresponding location in the output pixel matrix B represents the chroma value of the pixel at the corresponding location in the filtered picture block, the output pixel matrix B is an example of a seventh pixel matrix. Alternatively, when the element at the corresponding location in the output pixel matrix B represents the chroma residual value of the pixel at the corresponding location in the filtered picture block, the output pixel matrix B is an example of an eighth pixel matrix.

The first picture block may be a picture block in a reconstructed picture reconstructed by the encoder or the decoder, or may be a reconstructed picture block reconstructed by the encoder or the decoder. The loop filtering method in this embodiment includes but is not limited to performing filtering processing on the reconstructed picture block. It should be understood that the loop filtering method is also applicable to performing filtering processing on the reconstructed picture, that is, "reconstructed picture block" in the method in this embodiment is adaptively replaced with the reconstructed picture. Details are not described herein again.

It should be noted that the first picture block and the second picture block may further use an RGB format. In this case, the element at the corresponding location in the first pixel matrix may correspond to (for example, represent) an R value, a G value, or a B value of the pixel at the corresponding location in the first picture block, the element at the corresponding location in the second pixel matrix may correspond to (for example, represent) a quantization step value corresponding to the R value, the G value, or the B value of the pixel at the corresponding location in the first picture block, or a quantization step value jointly used by the R value, the G value, and the B value.

In this application, when the filtering network is used to implement filtering, a quantization step value of each pixel of the reconstructed picture block is introduced, so that filtering processing can be better performed on a pixel matrix that is input to the filtering network and that corresponds to the picture block. Therefore, filtering effect is improved.

In a possible implementation, the input pixel matrix includes the first pixel matrix and the second pixel matrix. Alternatively, the input pixel matrix is a first preprocessed matrix obtained by preprocessing the first pixel matrix and the second pixel matrix. Alternatively, the input pixel matrix includes a normalized matrix of the first pixel matrix and a normalized matrix of the second pixel matrix. Alternatively, the input pixel matrix is a second preprocessed matrix obtained by preprocessing a normalized matrix of the first pixel matrix and a normalized matrix of the second pixel matrix. The normalized matrix is a matrix obtained by performing normalization processing on a value of an element at a corresponding location in a corresponding matrix.

The input pixel matrix is a processing object of the filtering network. The input pixel matrix may include the obtained first pixel matrix and the obtained second pixel matrix, that is, the two pixel matrices are directly input to the filtering network for filtering processing.

Before being input to the filtering network, the input pixel matrix may also be a pixel matrix obtained by performing preprocessing and/or normalization processing on one or more pixel matrices based on a training data form of the filtering network during training and a processing capability of the filtering network. An objective of normalization processing is to adjust values of elements to a unified value range, for example, [0, 1] or [−0.5, 0.5]. This can improve operation efficiency in calculation of the filtering network. The preprocessing may include matrix addition, matrix multiplication, matrix combination (concat), and the like. This can reduce a calculation amount of the filtering network. Therefore, the input pixel matrix may include the normalized matrix of the first pixel matrix and the normalized matrix of the second pixel matrix. To be specific, normalization processing is separately performed on the first pixel matrix and the second pixel matrix, and then the normalized matrices of the first pixel matrix and the second pixel matrix are input to the filtering network for processing. Alternatively, the input pixel matrix may be a preprocessed matrix obtained after addition, multiplication, or combination is performed on the first pixel matrix and the second pixel matrix. Alternatively, the input pixel matrix may be a preprocessed matrix obtained after addition, multiplication, or combination is performed on the normalized matrix of the first pixel matrix and the normalized matrix of the second pixel matrix.

Matrix addition indicates that values of elements at corresponding locations in two matrices are added. Matrix multiplication indicates that values of elements at corresponding locations in two matrices are multiplied. Matrix combination (concat) indicates that a quantity of channels of a matrix is increased. For example, one matrix is a two-dimensional matrix whose size is m×n, and the other matrix is also a two-dimensional matrix whose size is also m×n. The two matrices are combined to obtain a three-dimensional matrix whose size is m×n×2.

In a possible implementation, the element at the corresponding location in the third pixel matrix represents the luminance value of the pixel at the corresponding location in the second picture block.

In a possible implementation, the element at the corresponding location in the third pixel matrix represents the luminance residual value of the pixel at the corresponding location in the second picture block. The method further includes: adding values of the elements at the corresponding locations in the first pixel matrix and the third pixel matrix to obtain a fourth pixel matrix. An element at a corresponding location in the fourth pixel matrix corresponds to (for example, represents) the luminance value of the pixel at the corresponding location in the second picture block.

Based on the training data form of the filtering network during training and the processing capability of the filtering network, the element in the third pixel matrix that is output from the filtering network may represent two meanings. One meaning is the luminance value of the pixel at the corresponding location in the second picture block, that is, the filtering network may directly output the third pixel matrix that represents the luminance value of the filtered second picture block. The other meaning is the luminance residual value of the pixel at the corresponding location in the second picture block, that is, the filtering network outputs the third pixel matrix that represents the luminance residual value of the filtered second picture block. In this case, the third pixel matrix needs to be further processed to obtain the fourth pixel matrix that represents the luminance value of the filtered second picture block. The processing is adding the first pixel matrix that represents the luminance value of the unfiltered first picture block and the third pixel matrix that represents the luminance residual value of the filtered second picture block, to obtain the fourth pixel matrix that represents the luminance value of the filtered second picture block. In this way, the filtering network is not specifically limited, and there may be more possibilities for the filtering network.

In a possible implementation, when the input pixel matrix is a normalized matrix, the method further includes: performing denormalization processing on the value of the element at the corresponding location in the third pixel matrix.

In a possible implementation, the adding values of the elements at the corresponding locations in the first pixel matrix and the third pixel matrix to obtain a fourth pixel matrix when normalization processing is performed on the input pixel matrix includes: adding the value of the element at the corresponding location in the first pixel matrix and the denormalized value of the element at the corresponding location in the third pixel matrix, to obtain the fourth pixel matrix.

As described above, if normalization processing is performed on the matrix before the matrix is input to the filtering network, values of all elements in the matrix are normalized into a same range, to improve operation efficiency. However, the value of the element cannot represent a meaningful value of a pixel at a corresponding location in the picture block. Therefore, to adapt to a subsequent picture processing process, after a matrix is output from the filtering network, denormalization processing needs to be performed on the matrix, to restore meanings represented by the elements in the matrix.

In a possible implementation, the method further includes: obtaining a fifth pixel matrix. An element at a corresponding location in the fifth pixel matrix corresponds to (for example, represents) a chroma value of the pixel at the corresponding location in the first picture block. Correspondingly, the input pixel matrix is related to at least the first pixel matrix, the second pixel matrix, and the fifth pixel matrix. In a possible implementation, the input pixel matrix includes the first pixel matrix, the second pixel matrix, and the fifth pixel matrix. Alternatively, the input pixel matrix includes the fifth pixel matrix and the first preprocessed matrix that is obtained by preprocessing the first pixel matrix and the second pixel matrix. Alternatively, the input pixel matrix includes the normalized matrix of the first pixel matrix, the normalized matrix of the second pixel matrix, and a normalized matrix of the fifth pixel matrix. Alternatively, the input pixel matrix includes a normalized matrix of the fifth pixel matrix and the second preprocessed matrix that is obtained by preprocessing the normalized matrix of the first pixel matrix and the normalized matrix of the second pixel matrix.

In addition to the two pixel matrices representing the luminance value of the pixel in the first picture block and the quantization step value corresponding to the luminance value, a reference factor that represents the chroma value of the pixel in the first picture block as filtering may be further added to the filtering network in this application. The luminance value and a chroma value of the pixel in the first picture block are correlated. Therefore, during filtering, the luminance value and the chroma value of the pixel may play a filtering assisting role on each other. Therefore, when the filtering network is trained, a chroma matrix of the picture block is added to training data. In this way, the filtering network can refer to chroma information during filtering, thereby improving filtering effect. Therefore, in this application, a factor of the fifth pixel matrix representing the chroma value of the pixel in the first picture block may be further added to the input pixel matrix. For specific content and an obtaining manner of the input pixel matrix, refer to the foregoing description. Details are not described herein again.

In a possible implementation, the method further includes: obtaining a sixth pixel matrix. An element at a corresponding location in the sixth pixel matrix corresponds to (for example, represents) a quantization step value corresponding to the chroma value of the pixel at the corresponding location in the first picture block. Correspondingly, the input pixel matrix is related to at least the first pixel matrix, the second pixel matrix, the fifth pixel matrix, and the sixth pixel matrix.

In addition to the three pixel matrices representing the luminance value of the pixel in the first picture block, the quantization step value corresponding to the luminance value, and the chroma value, a reference factor that represents a quantization step corresponding to the chroma value of the pixel in the first picture block as filtering may be further added to the filtering network in this application. When the filtering network is trained, a quantization step matrix corresponding to the chroma value of the picture block is added to the training data. In this way, the filtering network can further refine the filtering function of the neural network based on the quantization step matrix during filtering, thereby achieving more accurate filtering effect. Therefore, in this application, a factor of the sixth pixel matrix representing the quantization step value corresponding to the chroma value of the pixel in the first picture block may be further added to the input pixel matrix. For specific content and an obtaining manner of the input pixel matrix, refer to the foregoing description. Details are not described herein again.

In a possible implementation, the input pixel matrix includes the first pixel matrix, the second pixel matrix, the fifth pixel matrix, and the sixth pixel matrix. Alternatively, the input pixel matrix includes the fifth pixel matrix, the sixth pixel matrix, and the first preprocessed matrix that is obtained by preprocessing the first pixel matrix and the second pixel matrix. Alternatively, the input pixel matrix includes the first pixel matrix, the second pixel matrix, and a third preprocessed matrix that is obtained by preprocessing the fifth pixel matrix and the sixth pixel matrix. Alternatively, the input pixel matrix includes the first preprocessed matrix and a third preprocessed matrix. Alternatively, the input pixel matrix includes the normalized matrix of the first pixel matrix, the normalized matrix of the second pixel matrix, the normalized matrix of the fifth pixel matrix, and a normalized matrix of the sixth pixel matrix. Alternatively, the input pixel matrix includes the normalized matrix of the fifth pixel matrix, a normalized matrix of the sixth pixel matrix, and the second preprocessed matrix that is obtained by preprocessing the normalized matrix of the first pixel matrix and the normalized matrix of the second pixel matrix. Alternatively, the input pixel matrix includes the normalized matrix of the first pixel matrix, the normalized matrix of the second pixel matrix, and a fourth preprocessed matrix that is obtained by preprocessing the normalized matrix of the fifth pixel matrix and a normalized matrix of the sixth pixel matrix. Alternatively, the input pixel matrix includes the second preprocessed matrix and a fourth preprocessed matrix.

Similarly, with the chroma information, the quantization step value corresponding to the chroma value may be further added when the filtering network is trained. Therefore, the factor of the sixth pixel matrix representing the quantization step value corresponding to the chroma value of the pixel in the first picture block may be further added to the input pixel matrix in this application. For specific content and an obtaining manner of the input pixel matrix, refer to the foregoing description. Details are not described herein again.

In a possible implementation, the performing filtering processing on an input pixel matrix by using a filtering network to obtain an output pixel matrix includes: performing filtering processing on the input pixel matrix by using the filtering network to obtain the third pixel matrix and a seventh pixel matrix. An element at a corresponding location in the seventh pixel matrix corresponds to (for example, represents) a chroma value of the pixel at the corresponding location in the second picture block.

With the fifth pixel matrix that represents the chroma value of the pixel in the first picture block, and even the sixth pixel matrix that represents the quantization step value corresponding to the chroma value of the pixel in the first picture block, the filtering network can be trained to filter and output the seventh pixel matrix that represents the chroma value of the pixel in the filtered second picture block. In this way, the filtering network can separately perform filtering processing on a luminance component and a chroma component of the first picture block, to implement filtering processing on the first picture block in different dimensions.

In a possible implementation, when the input pixel matrix is a normalized matrix, the method further includes: performing denormalization processing on a value of the element at the corresponding location in the seventh pixel matrix.

A principle of denormalization processing is similar to that of denormalization processing of the third pixel matrix. Details are not described herein again.

In a possible implementation, performing filtering processing on the input pixel matrix by using the filtering network to obtain the third pixel matrix includes: performing filtering processing on the input pixel matrix by using the filtering network to obtain the third pixel matrix and an eighth pixel matrix, where an element at a corresponding location in the eighth pixel matrix corresponds to (for example, represents) a chroma residual value of the pixel at the corresponding location in the second picture block: and adding values of elements at the corresponding locations in the fifth pixel matrix and the eighth pixel matrix to obtain a ninth pixel matrix. An element at a corresponding location in the ninth pixel matrix corresponds to (for example, represents) a chroma value of the pixel at the corresponding location in the second picture block.

In a possible implementation, when the input pixel matrix is a normalized matrix, the method further includes: performing denormalization processing on the value of the element at the corresponding location in the eighth pixel matrix. Correspondingly, the adding values of the elements at the corresponding locations in the fifth pixel matrix and the eighth pixel matrix to obtain a ninth pixel matrix includes: adding the value of the element at the corresponding location in the fifth pixel matrix and the denormalized value of the element at the corresponding location in the eighth pixel matrix, to obtain the ninth pixel matrix.

Similarly, the filtering network may output the third pixel matrix representing the luminance residual value of the second picture block, or may output the eighth pixel matrix representing the chroma residual value of the second picture block. Subsequent processing of outputting the eighth pixel matrix is similar to subsequent processing of the third pixel matrix. Details are not described herein again.

In a possible implementation, the preprocessing includes: adding elements at corresponding locations in two matrices, or combining two matrices in a depth direction, or multiplying elements at corresponding locations in two matrices.

In a possible implementation, the method further includes: obtaining a training matrix set, where the training matrix set includes a plurality of before-filtering luminance matrices (that is, unfiltered luminance matrices, i.e. luminance matrices on which filtering is not performed) of a plurality of picture blocks, a plurality of quantization step matrices of the plurality of picture blocks, and a plurality of after-filtering luminance matrices (that is, filtered luminance matrices, i.e. luminance matrices on which filtering is performed) of the plurality of picture blocks: and an element at a corresponding location in a before-filtering luminance matrix corresponds to (for example, represents) an unfiltered luminance value of a pixel at a corresponding location in a corresponding picture block, an element at a corresponding location in a quantization step matrix corresponds to (for example, represents) a quantization step value corresponding to a luminance value of the pixel at the corresponding location in the corresponding picture block, and an element at a corresponding location in an after-filtering luminance matrix corresponds to (for example, represents) a filtered luminance value of the pixel at the corresponding location in the corresponding picture block: and performing training based on the training matrix set to obtain the filtering network.

In a possible implementation, the training matrix set further includes a plurality of before-filtering chroma matrices (that is, chroma matrices on which filtering is not performed) of the plurality of picture blocks and a plurality of after-filtering chroma matrices (that is, chroma matrices on which filtering is performed) of the plurality of picture blocks. An element at a corresponding location in a before-filtering chroma matrix corresponds to (for example, represents) an unfiltered chroma value of the pixel at the corresponding location in the corresponding picture block. An element at a corresponding location in an after-filtering chroma matrix corresponds to (for example, represents) a filtered chroma value of the pixel at the corresponding location in the corresponding picture block.

As described above, the filtering network is used as a neural network, and an input required by the filtering network, a function implemented by the filtering network, and an output that can be obtained by the filtering network are all related to the training data in a training phase. The training data in this application is the foregoing training matrix set.

In a possible implementation, the filtering network includes at least a convolutional layer and an activation layer.

In a possible implementation, a depth of a convolution kernel of the convolutional layer is 2, 3, 4, 5, 6, 16, 24, 32, 48, 64, or 128. A size of the convolution kernel of the convolutional layer is 1×1, 3×3, 5×5, or 7×7. For example, a size of a convolutional layer is 3×3×2×10. 3×3 represents a size of a convolution kernel in the convolutional layer. 2 represents a depth of the convolution kernel included in the convolutional layer. A quantity of data channels input to the convolutional layer is consistent with the depth of the convolution kernel included in the convolutional layer, that is, the quantity of data channels input to the convolutional layer is also 2. 10 represents a quantity of convolution kernels included in the convolutional layer. A quantity of data channels output from the convolutional layer is consistent with the quantity of convolution kernels included in the convolutional layer, that is, the quantity of data channels output from the convolutional layer is also 10.

In a possible implementation, the filtering network includes a convolutional neural network CNN, a deep neural network DNN, or a recurrent neural network RNN.

According to a second aspect, this application provides an encoder, including a processing circuit, configured to perform the method according to any one of the implementations of the first aspect.

According to a third aspect, this application provides a decoder, including a processing circuit, configured to perform the method according to any one of the implementations of the first aspect.

According to a fourth aspect, this application provides a computer program product, including program code for performing the method according to any one of the implementations of the first aspect when executed on a computer or a processor.

According to a fifth aspect, this application provides an encoder, including one or more processors, and a non-transitory computer-readable storage medium coupled to the processors and storing a program executed by the processors, where when the program is executed by the processors, the decoder is enabled to perform the method according to any one of the implementations of the first aspect.

According to a sixth aspect, this application provides a decoder, including one or more processors, and a non-transitory computer-readable storage medium coupled to the processors and storing a program executed by the processors, where when the program is executed by the processors, the encoder is enabled to perform the method according to any one of the implementations of the first aspect.

According to a seventh aspect, this application provides a non-transitory computer-readable storage medium, including program code for performing the method according to any one of the implementations of the first aspect when executed by a computer device.

According to an eighth aspect, the present invention relates to a coding apparatus. For beneficial effects, refer to the descriptions of the first aspect. Details are not described herein again. The coding apparatus has a function of implementing a behavior in the method embodiment in the first aspect. The function may be implemented by hardware, or may be implemented by hardware executing corresponding software. The hardware or the software includes one or more modules corresponding to the foregoing function. In a possible design, the coding apparatus includes: a reconstruction module, configured to obtain a first pixel matrix: a quantization module, configured to obtain a second pixel matrix: and a loop filtering module, configured to implement the method according to any one of the implementations of the first aspect. These modules may perform corresponding functions in the method example in the first aspect. For details, refer to the detailed descriptions in the method example, and the details are not described herein again.

Details of one or more embodiments are set forth in the accompanying drawings and the description below. Other features, objects, and advantages will be apparent from the description, drawings, and claims.

BRIEF DESCRIPTION OF DRAWINGS

The following describes the accompanying drawings used in embodiments of this application.

FIG. 9a to FIG. 9l illustrate several examples of an input pixel matrix of a filtering network.

DESCRIPTION OF EMBODIMENTS

Figure 1A:
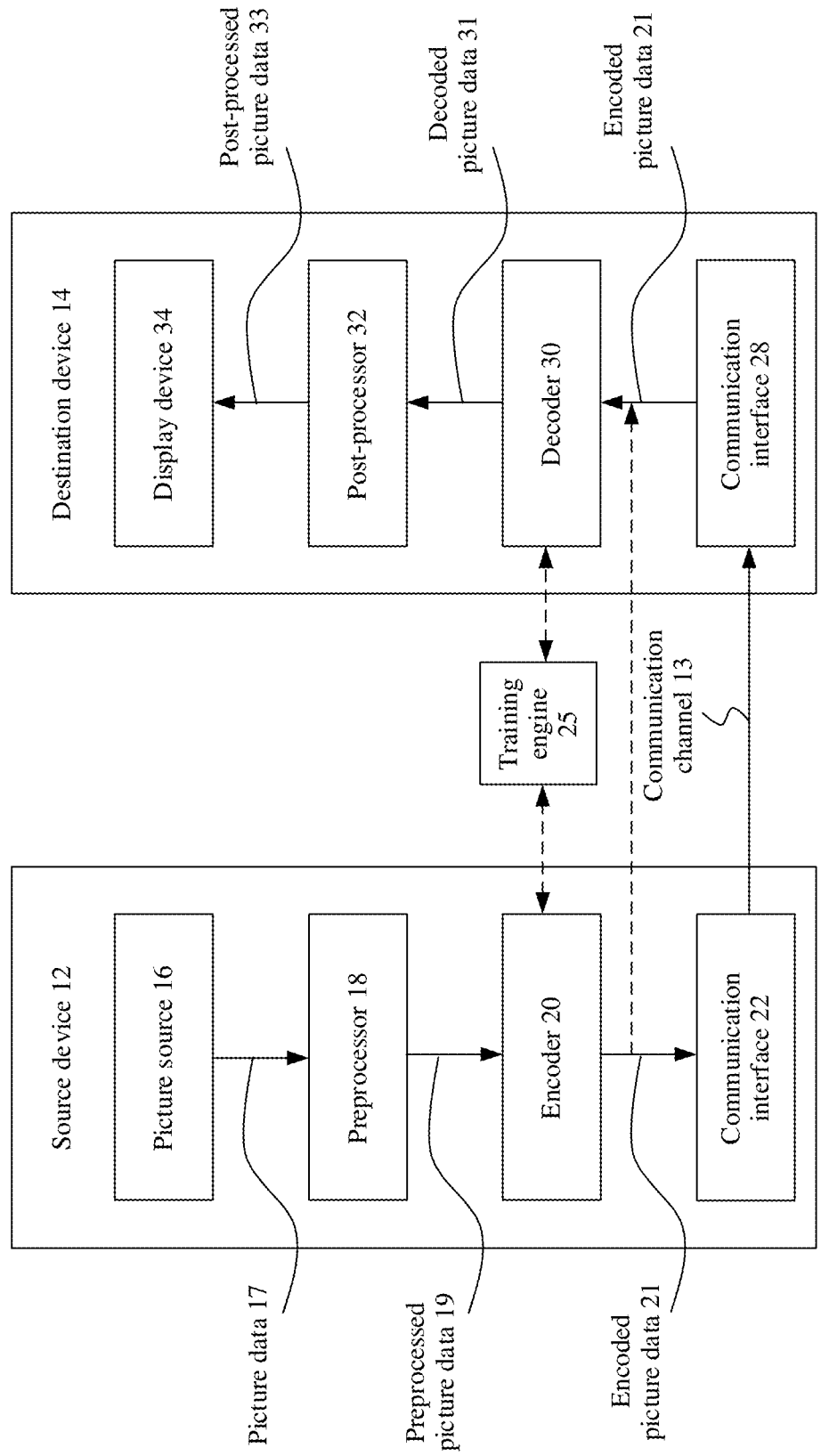
FIG. 1A is a block diagram showing an example of a video coding system configured to implement embodiments of the present invention, where the system uses a neural network to encode or decode a video picture.

Embodiments of this application provide an AI-based video picture compression technology, in particular, provide a neural network-based video compression technology, and specifically provide a neural network-based filtering technology, to improve a conventional hybrid video encoding and decoding system.

Video coding typically refers to processing of a sequence of pictures that form a video or a video sequence. In the field of video coding, the terms "picture", "frame", and "image" may be used as synonyms. Video coding (or coding in general) includes two parts video encoding and video decoding. Video encoding is performed at a source side, typically including processing (for example, by compression) the original video pictures to reduce the amount of data required for representing the video pictures (for more efficient storage and/or transmission). Video decoding is performed on a destination side, and typically includes inverse processing in comparison with processing of the encoder to reconstruct the video pictures. Embodiments referring to "coding" of video pictures (or pictures in general) shall be understood to relate to "encoding" or "decoding" of video pictures or respective video sequences. A combination of an encoding part and a decoding part is also referred to as CODEC (encoding and decoding).

In a case of lossless video coding, the original video pictures can be reconstructed. In other words, the reconstructed video pictures have same quality as the original video pictures (assuming no transmission loss or other data loss during storage or transmission). In a case of lossy video coding, further compression is performed through, for example, quantization, to reduce an amount of data required for representing the video pictures, which cannot be completely reconstructed at a decoder side. In other words, quality of the reconstructed video pictures is lower or worse compared to the quality of the original video pictures.

Several video coding standards belong to the group of "lossy hybrid video codecs" (that is, spatial and temporal prediction in a pixel domain is combined with 2D transform coding for applying quantization in a transform domain). Each picture of a video sequence is typically partitioned into a set of non-overlapping blocks, and coding is typically performed at a block level. In other words, at the encoder, a video is usually processed and encoded, at a block (video block) level. For example, a prediction block is generated through spatial (intra-picture) prediction and temporal (inter-picture) prediction, the prediction block is subtracted from a current block (block being processed or to be processed) to obtain a residual block, and the residual block is transformed in the transform domain and quantized to reduce the amount of data that is to be transmitted (compressed). At a decoder side, an inverse processing part compared to the encoder is applied to an encoded block or a compressed block to reconstruct the current block for representation. Furthermore, the encoder duplicates the decoder processing step, so that the encoder and the decoder generate same prediction (for example, intra prediction and inter prediction) and/or pixel reconstruction, for processing, that is, for coding subsequent blocks.

In the following embodiments of a coding system 10, an encoder 20 and a decoder 30 are described based on FIG. 1A to FIG. 3.

FIG. 1A is a schematic block diagram illustrating an example coding system 10, for example, a video coding system 10 (or a coding system 10 for short) that may utilize techniques of this application. The video encoder 20 (or the encoder 20 for short) and the video decoder 30 (or the decoder 30 for short) of the video coding system 10 represent examples of devices that may be configured to perform techniques in accordance with various examples described in this application.

As shown in FIG. 1A, the coding system 10 includes a source device 12 configured to provide encoded picture data 21 such as encoded pictures, to a destination device 14 for decoding the encoded picture data 21.

The source device 12 includes an encoder 20, and may additionally, that is, optionally, include a picture source 16, a preprocessor (or preprocessing unit) 18, for example, a picture preprocessor, and a communication interface (or communication unit) 22.

The picture source 16 may include or be any kind of picture capturing device, for example, a camera for capturing a real-world picture, and/or any kind of a picture generating device, for example, a computer-graphics processor for generating a computer animated picture, or any kind of other device for obtaining and/or providing a real-world picture, a computer generated picture (for example, a screen content, a virtual reality (VR) picture) and/or any combination thereof (for example, an augmented reality (AR) picture). The picture source may be any kind of memory or storage storing any of the aforementioned pictures.

In distinction to the processing performed by the preprocessor (or preprocessing unit) 18, the picture (or picture data) 17 may also be referred to as raw picture (or raw picture data) 17.

The preprocessor 18 is configured to receive the (raw) picture data 17 and to perform preprocessing on the picture data 17 to obtain a preprocessed picture (preprocessed picture data) 19. The preprocessing performed by the preprocessor 18 may, for example, include trimming, color format conversion (for example, from RGB to YCbCr), color correction, or de-noising. It can be understood that the preprocessing unit 18 may be an optional component.

The video encoder (or encoder) 20 is configured to receive the preprocessed picture data 19 and provide encoded picture data 21 (further details are described below, for example, based on FIG. 2).

A communication interface 22 of the source device 12 may be configured to receive the encoded picture data 21 and to transmit the encoded picture data 21 (or any further processed version thereof) over a communication channel 13 to another device, for example, the destination device 14 or any other device, for storage or direct reconstruction.

The destination device 14 includes a decoder 30, and may additionally, that is, optionally, include a communication interface (or communication unit) 28, a post-processor (or post-processing unit) 32 and a display device 34.

The communication interface 28 of the destination device 14 is configured to directly receive the encoded picture data 21 (or any further processed version thereof) from the source device 12 or any other source device such as a storage device, and provide the encoded picture data 21 to the decoder 30. For example, the storage device is an encoded picture data storage device.

The communication interface 22 and the communication interface 28 may be configured to transmit or receive the encoded picture data (or encoded data) 21 via a direct communication link between the source device 12 and the destination device 14, for example, a direct wired or wireless connection, or via any kind of network, for example, a wired or wireless network or any combination thereof, or any kind of private and public network, or any kind of combination thereof.

The communication interface 22 may be, for example, configured to package the encoded picture data 21 into an appropriate format, for example, packets, and/or process the encoded picture data using any kind of transmission encoding or processing for transmission over a communication link or communication network.

The communication interface 28, forming the counterpart of the communication interface 22, may be, for example, configured to receive the transmitted data and process the transmission data using any kind of corresponding transmission decoding or processing and/or de-packaging to obtain the encoded picture data 21.

Both a communication interface 22 and a communication interface 28 may be configured as unidirectional communication interfaces as indicated by the arrow for the communication channel 13 in FIG. 1A pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide a decoded picture (or decoded picture data) 31 (further details are described below, for example, based on FIG. 3).

The post-processor 32 is configured to post-process the decoded picture data 31 (also called reconstructed picture data), for example, the decoded picture, to obtain post-processed picture data 33, for example, a post-processed picture. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by a display device 34.

The display device 34 is configured to receive the post-processed picture data 33 for displaying the picture, for example, to a user or viewer. The display device 34 may be or include any kind of display for representing the reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any kind of other display.

The coding system 10 further includes a training engine 25. The training engine 25 is configured to train the encoder 20 (especially a loop filter 220 in the encoder 20) or the decoder 30 (especially a loop filter 320 in the decoder 30) to perform filtering processing on a reconstructed picture.

Training data in this embodiment includes a training matrix set. The training matrix set includes a before-filtering luminance matrix, a quantization step matrix, and an after-filtering luminance matrix of a picture block. A pixel at a corresponding location in the before-filtering luminance matrix corresponds to an unfiltered luminance value of a pixel at a corresponding location in a corresponding picture block. A pixel at a corresponding location in the quantization step matrix corresponds to a quantization step value corresponding to a luminance value of the pixel at the corresponding location in the corresponding picture block. A pixel at a corresponding location in the after-filtering luminance matrix corresponds to a filtered luminance value of the pixel at the corresponding location in the corresponding picture block.

Figure 6A:
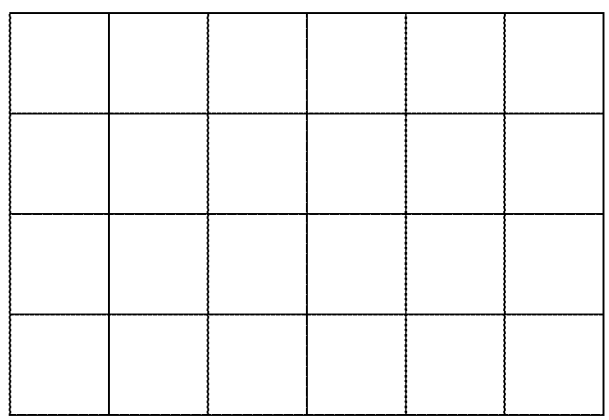
FIG. 6a to FIG. 6c are schematic diagrams of matrices of an input filtering network according to an embodiment of this application.
Figure 6B:
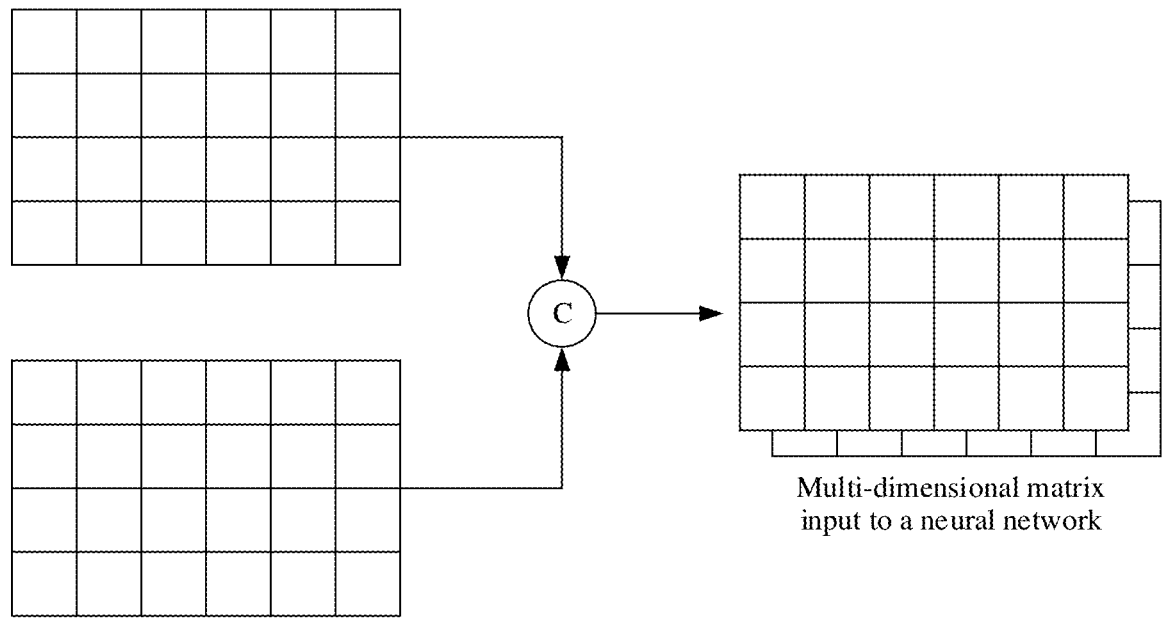
Figure 6C:
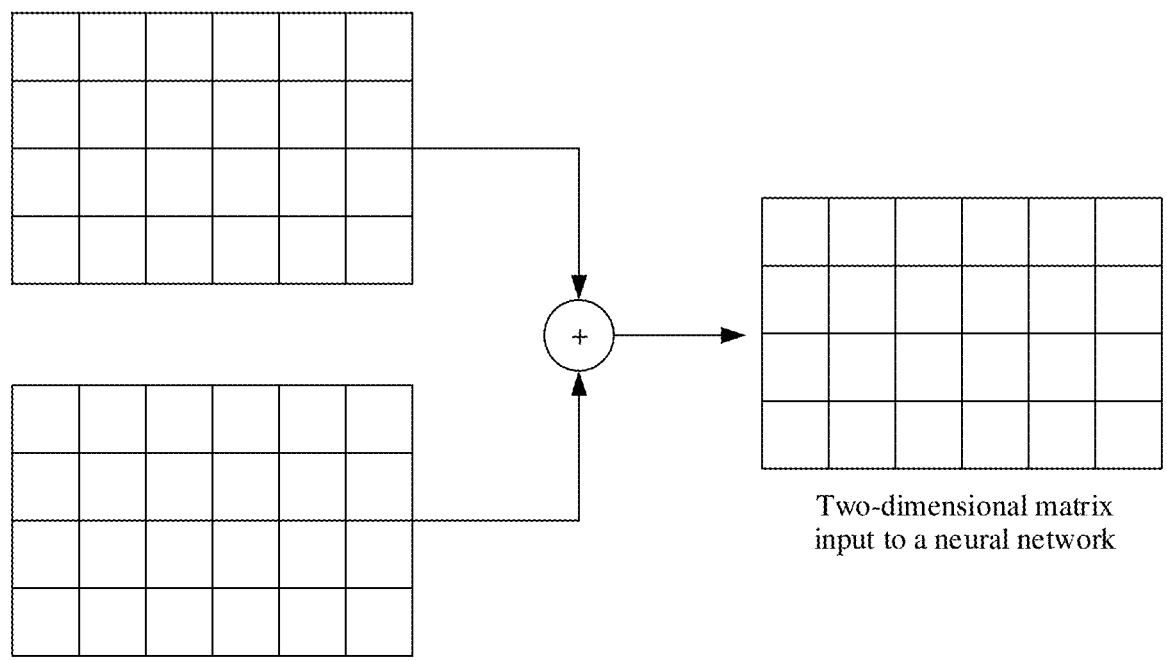

For example, a plurality of matrices in the training matrix set may be input to the training engine 25 in a manner shown in FIG. 6a to FIG. 6c. As shown in FIG. 6a, the plurality of matrices in the training matrix set are directly input to the training engine 25. The plurality of matrices are all two-dimensional matrices. As shown in FIG. 6b, some or all of the plurality of matrices in the training matrix set are selected to perform combination processing to obtain a multi-dimensional matrix, and then the multi-dimensional matrix is input to the training engine 25. As shown in FIG. 6c, some or all of the plurality of matrices in the training matrix set are selected to perform addition (or multiplication) processing to obtain a two-dimensional matrix, and then the two-dimensional matrix is input to the training engine 25.

The training data may be stored in a database (not shown). The training engine 25 performs training based on the training data to obtain a target model (for example, the target model may be a neural network used for loop filtering). It should be noted that a source of the training data is not limited in this embodiment. For example, the training data may be obtained from a cloud or another place to perform model training.

Due to a process in which the training engine 25 trains the target model, a before-filtering pixel approaches an original pixel value. A small batch size of 64 pictures and an initial learning rate of 1e-4 may be used in each training process. Each training process may comply with a step of 10. The training data may be data generated by an encoder under different QP quantization parameter settings. The target model can be used for implementing the loop filtering method provided in this embodiment. To be specific, a reconstructed picture or picture block is input to the target model after related preprocessing, to obtain a filtered picture or picture block. The target model in this embodiment may be specifically a filtering network. The following describes the target model in detail with reference to FIG. 7a to FIG. 7e.

The target model obtained through training by the training engine 25 may be applied to the coding system 10, for example, applied to the source device 12 (for example, the encoder 20) or the destination device 14 (for example, the decoder 30) shown in FIG. 1A. The training engine 25 may obtain the target model through training on the cloud, and the coding system 10 downloads the target model from the cloud and uses the target model. Alternatively, the training engine 25 may obtain the target model through training on the cloud and use the target model, and the coding system 10 directly obtains a processing result from the cloud. For example, the training engine 25 performs training to obtain a target model having a filtering function, the coding system 10 downloads the target model from the cloud, and a loop filter 220 in the encoder 20 or a loop filter 320 in the decoder 30 may perform filtering processing on an input reconstructed picture or an input reconstructed picture block based on the target model, to obtain a filtered picture or a filtered picture block. For another example, the training engine 25 performs training to obtain a target model having a filtering function, and the coding system 10 does not need to download the target model from the cloud. The encoder 20 or the decoder 30 transmits a reconstructed picture or a reconstructed picture block to the cloud, and the cloud performs filtering processing on the reconstructed picture or the reconstructed picture block by using the target model, to obtain a filtered picture or a filtered picture block and transmit the filtered picture or the filtered picture block to the encoder 20 or the decoder 30.

Although FIG. 1A depicts the source device 12 and the destination device 14 as separate devices, a device embodiment may alternatively include both the source device 12 and the destination device 14 or functionalities of both the source device 12 and the destination device 14, namely, the source device 12 or a corresponding functionality and the destination device 14 or a corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
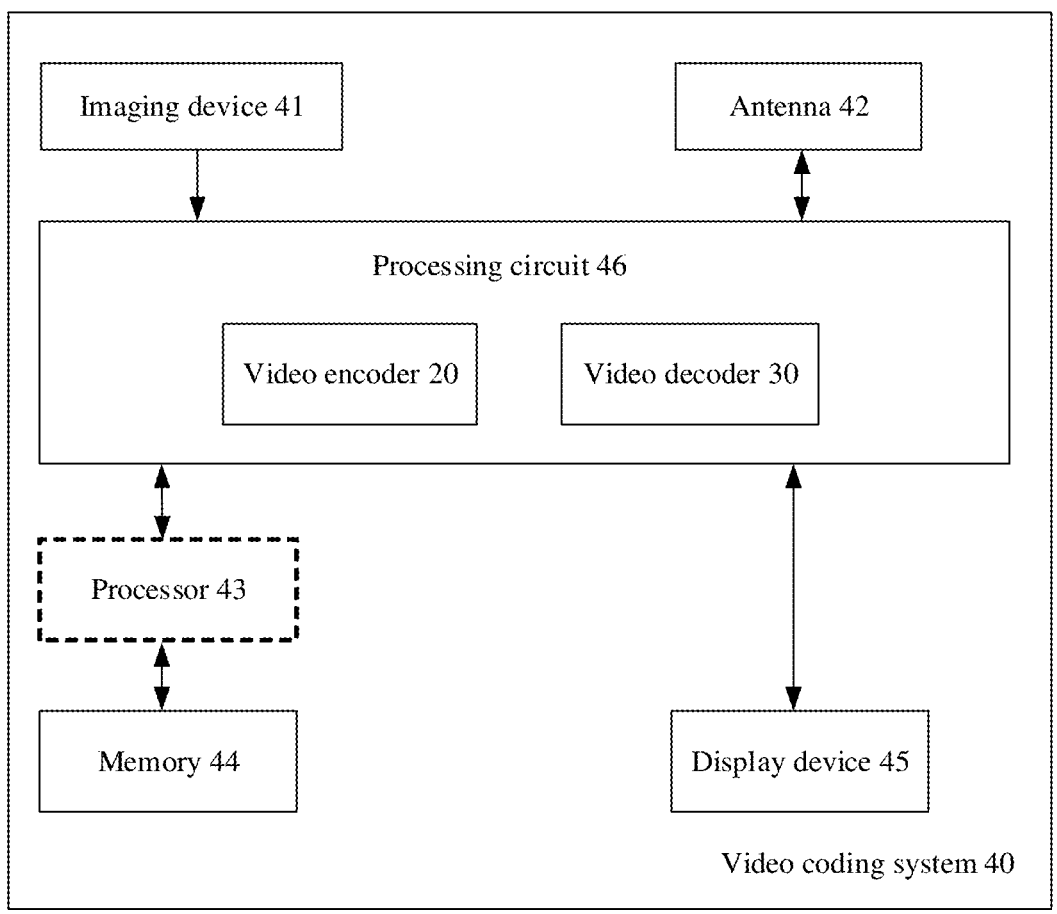
FIG. 1B is a block diagram showing another example of a video coding system configured to implement embodiments of the present invention, where a video encoder and/or a video decoder use/uses a neural network to encode or decode a video picture.
Figure 5:
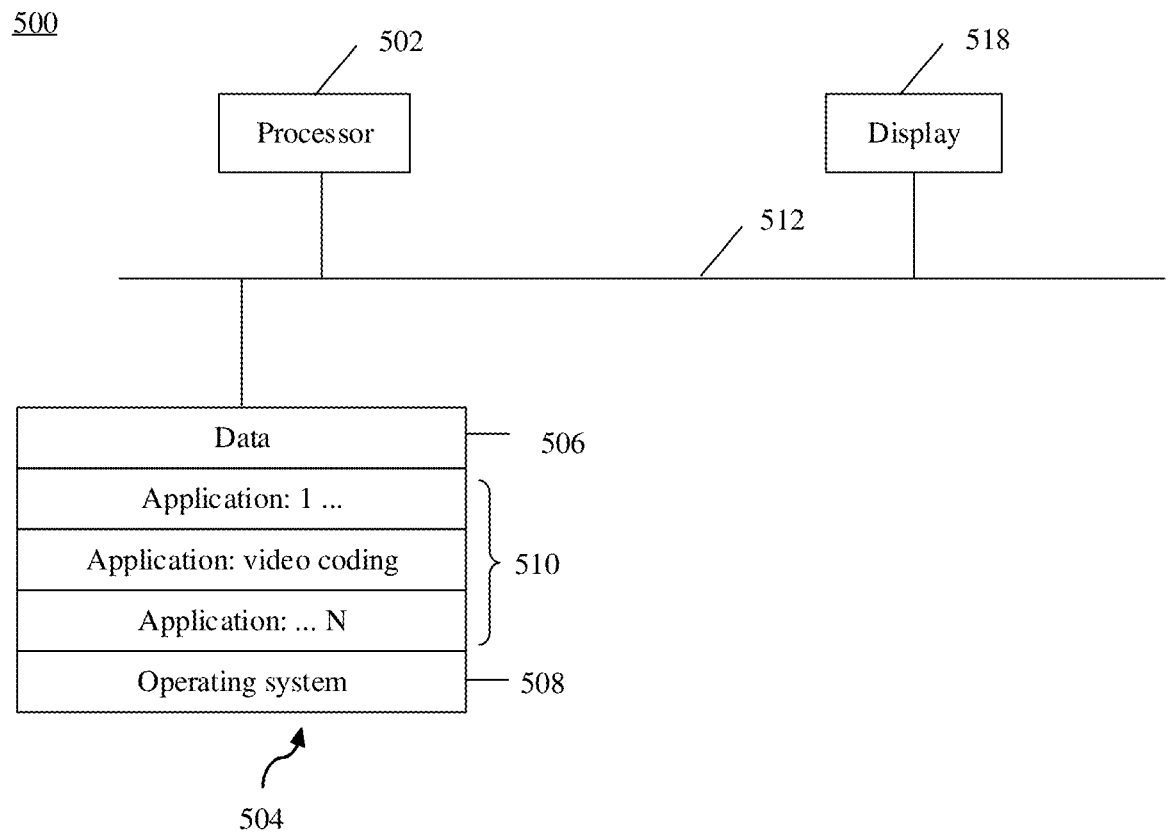
FIG. 5 is a block diagram illustrating a video coding apparatus configured to implement embodiments of the present invention.

The encoder 20 (for example, the video encoder 20) or the decoder 30 (for example, the video decoder 30) or both the encoder 20 and the decoder 30 may be implemented via a processing circuit as shown in FIG. 1B, such as one or more microprocessors, digital signal processors (DSPs), application-specific integrated circuits (ASICs), field-programmable gate arrays (FPGAs), discrete logic, hardware, video coding dedicated processors or any combinations thereof. The encoder 20 may be implemented via a processing circuit 46 to embody the various modules as discussed with respect to the encoder 20 in FIG. 2 and/or any other encoder system or subsystem described herein. The decoder 30 may be implemented via the processing circuit 46 to embody the various modules as discussed with respect to the decoder 30 in FIG. 3 and/or any other decoder system or subsystem described herein. The processing circuit 46 may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of the present invention. Either of the video encoder 20 and the video decoder 30 may be integrated as part of a combined encoder/decoder (CODEC) in a single device, for example, as shown in FIG. 1B.

The source device 12 and the destination device 14 may include any of a wide range of devices, including any kind of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped with components for wireless communication. Therefore, the source device 12 and the destination device 14 may be wireless communication devices.

In some cases, the video coding system 10 illustrated in FIG. 1A is merely an example and the techniques of this application are applicable to video coding settings (for example, video encoding or video decoding) that do not necessarily include any data communication between the encoding device and the decoding device. In other examples, data is retrieved from a local memory, streamed over a network, or the like. A video encoding device may encode data and store encoded data into the memory, and/or a video decoding device may retrieve data from the memory and decode the data. In some examples, the encoding and decoding are performed by devices that do not communicate with one another, but simply encode data to the memory and/or retrieve and decode data from the memory.

Figure 2:
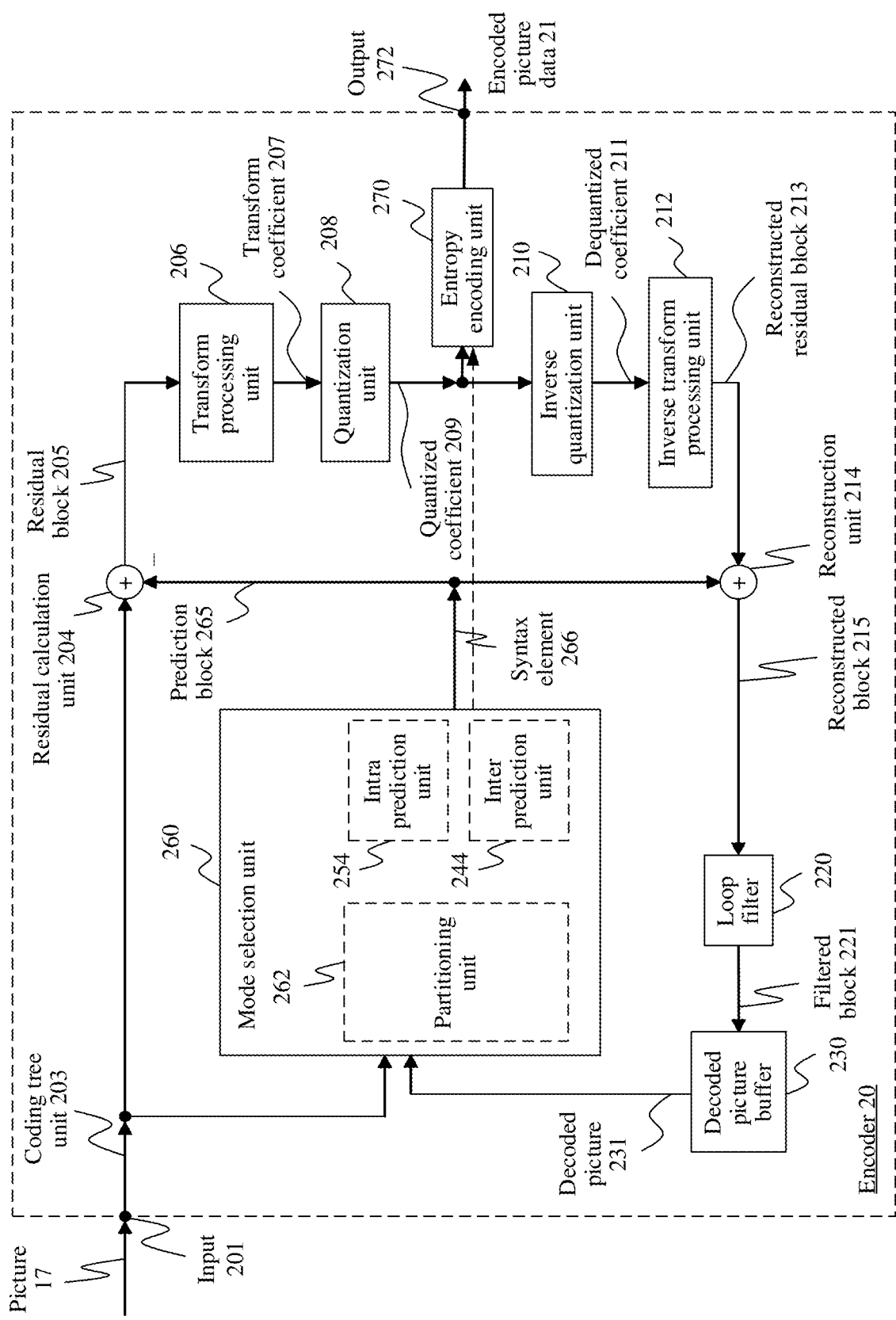
FIG. 2 is a block diagram showing an example of a video encoder configured to implement embodiments of the present invention, where the video encoder 20 uses a neural network to encode a video picture.
Figure 3:
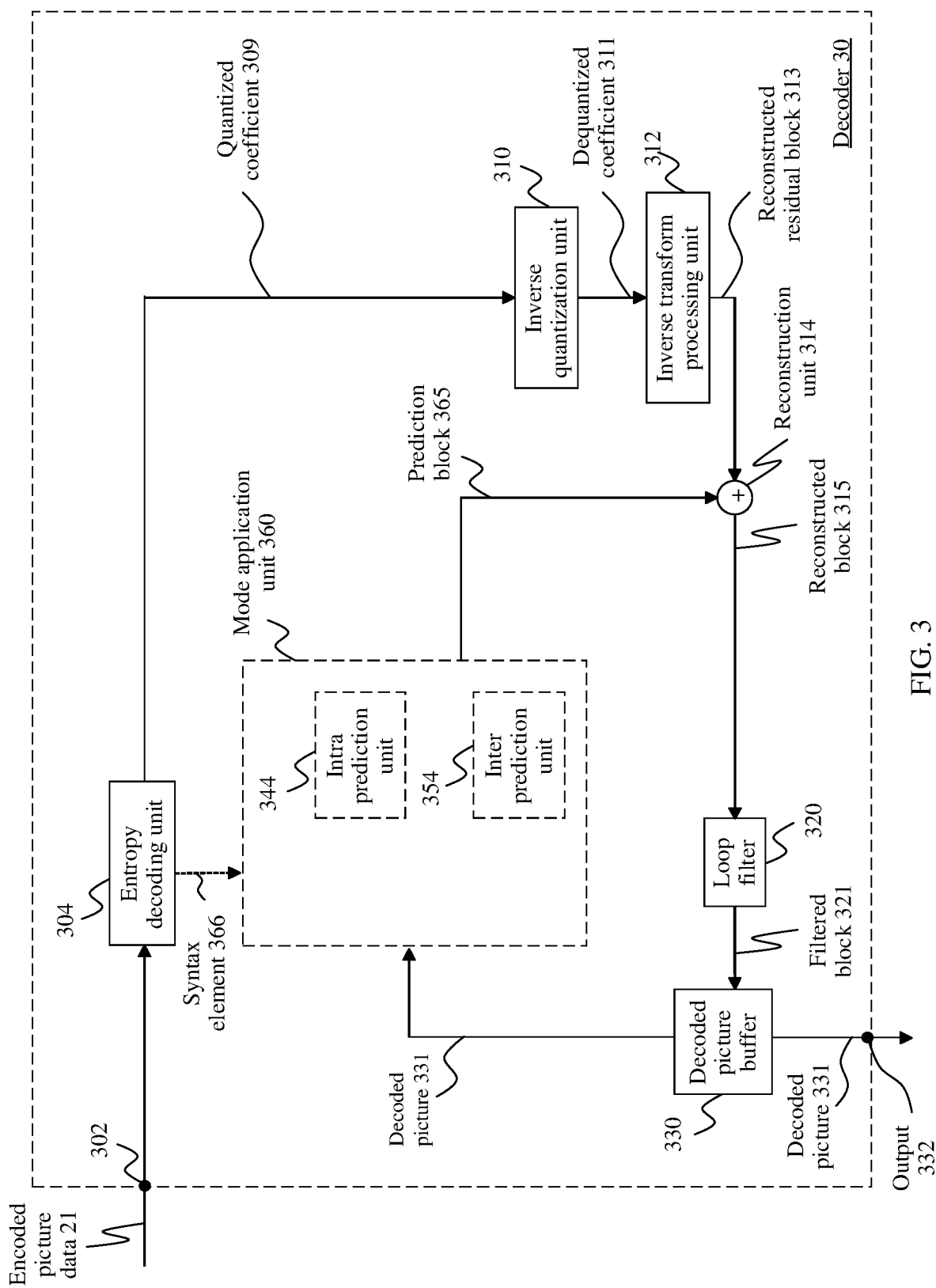
FIG. 3 is a block diagram showing an example of a video decoder configured to implement embodiments of the present invention, where the video decoder 30 uses a neural network to decode a video picture.

FIG. 1B is an illustrative diagram of an example of a video coding system 40, including the video encoder 20 in FIG. 2 and/or the video decoder 30 in FIG. 3, according to an example embodiment. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 1B, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In addition, the memory 44 may be any kind of memory, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by using the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may include the video encoder 20 as implemented via the processing circuit 46 to embody the various modules as discussed with respect to FIG. 2 and/or any other encoder system or subsystem described herein. The logic circuit may be configured to perform various operations described in this specification.

In some examples, the video decoder 30 may be implemented by the processing circuit 46 in a similar manner, to implement various modules that are described with reference to the video decoder 30 in FIG. 3 and/or any other decoder system or subsystem described in this specification. In some examples, the video decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may include the video decoder 30 as implemented via the processing circuit 46 to embody the various modules as discussed with respect to FIG. 3 and/or any other decoder system or subsystem described herein.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in this embodiment, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy-encode the syntax element into an encoded video bitstream. In such examples, the video decoder 30 may parse such syntax element and correspondingly decode the related video data.

For ease of description, embodiments of the present invention are described with reference to versatile video coding (VVC) or high-efficiency video coding (HEVC) developed by the joint collaboration team on video coding (JCT-VC) of the ITU-T video coding experts group (VCEG) and the ISO/IEC motion picture experts group (MPEG). A person of ordinary skill in the art understands that embodiments of the present invention are not limited to HEVC or VVC.

Encoder and Encoding Method

FIG. 2 shows a schematic block diagram of an example of the video encoder 20 that is configured to implement the techniques of this application. In the example shown in FIG. 2, the video encoder 20 includes an input (or input interface) 201, a residual calculation unit 204, a transform processing unit 206, a quantization unit 208, an inverse quantization unit 210, and inverse transform processing unit 212, a reconstruction unit 214, a loop filter 220, a decoded picture buffer (DPB) 230, a mode selection unit 260, an entropy encoding unit 270, and an output (or output interface) 272. The mode selection unit 260 may include an inter prediction unit 244, an intra prediction unit 254, and a partitioning unit 262. The inter prediction unit 244 may include a motion estimation unit and a motion compensation unit (not shown). The video encoder 20 shown in FIG. 2 may also be referred to as a hybrid video encoder or a video encoder based on a hybrid video codec.

Refer to FIG. 2, the loop filtering module is a trained target model (also referred to as a neural network). The neural network is configured to process an input picture or a picture area or a picture block, to obtain a filtered picture or picture area or picture block. For example, a neural network for loop filtering is configured to receive an input picture or picture area or picture block, for example, input picture data shown in FIG. 6a to FIG. 6c, and generate a filtered picture or picture area or picture block. The following describes in detail the neural network for loop filtering with reference to FIG. 7a to FIG. 7e.

The residual calculation unit 204, the transform processing unit 206, the quantization unit 208, and the mode selection unit 260 form a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244, and the intra prediction unit 254 form a backward signal path of the encoder. The backward signal path of the encoder 20 corresponds to the signal path of the decoder (refer to the decoder 30 in FIG. 3). The inverse quantization unit 210, the inverse transform processing unit 212, the reconstruction unit 214, the loop filter 220, the decoded picture buffer 230, the inter prediction unit 244, and the intra prediction unit 254 also form a "built-in decoder" of the video encoder 20.

Quantization

The quantization unit 208 may be configured to quantize transform coefficients 207 to obtain quantized coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and a corresponding and/or inverse dequantization, for example, by the inverse quantization unit 210, may include multiplication by the quantization step. Embodiments according to some standards, such as HEVC, may be configured to use the quantization parameter to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In one example implementation, the scaling of the inverse transform and dequantization might be combined. Alternatively, customized quantization tables may be used and signaled from an encoder to a decoder, for example, in a bitstream. The quantization is a lossy operation, where a larger quantization step indicates a larger loss.

In an embodiment, the video encoder 20 (correspondingly, the quantization unit 208) may be configured to output a quantization parameter (QP), for example, directly or encoded or compressed via the entropy encoding unit 270, so that, for example, the video decoder 30 may receive and apply the quantization parameter for decoding.

Inverse Quantization

The inverse quantization unit 210 is configured to apply the inverse quantization of the quantization unit 208 on the quantized coefficients to obtain dequantized coefficients 211, for example, apply, based on or by using a same quantization step as the quantization unit 208, the inverse of a quantization scheme applied by the quantization unit 208. The dequantized coefficients 211 may also be referred to as dequantized residual coefficients 211, and correspond to the transform coefficients 207, although the dequantized coefficients 211 are usually different from the transform coefficient due to a loss caused by quantization.

Reconstruction

The reconstruction unit 214 (for example, a summer 214) is configured to add a transform block 213 (that is, a reconstructed residual block 213) to the prediction block 265 to obtain a reconstructed block 215 in the pixel domain, for example, by adding pixel values of the reconstructed residual block 213 and the pixel values of the prediction block 265.

Filtering

The loop filter unit 220 (or the "loop filter" 220 for short), is configured to filter the reconstructed block 215 to obtain a filtered block 221, or in general, to filter reconstructed pixels to obtain filtered pixel values. For example, the loop filter unit is configured to smoothly perform pixel transitions or improve video quality. The loop filter unit 220 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. The order of the filtering process may be the deblocking filter, the SAO filter and the ALF filter. In another example, a process called luminance mapping with chroma scaling (LMCS) (namely, the adaptive in-loop reshaper) is added. This process is performed before deblocking. In another example, the deblocking filter process may be also applied to internal sub-block edges, for example, affine sub-block edges, ATMVP sub-block edges, sub-block transform (SBT) edges and intra sub-partition (ISP) edges. Although the loop filter unit 220 is shown as an in-loop filter in FIG. 2, in other configurations, the loop filter unit 220 may be implemented as a post-loop filter. The filtered block 221 may also be referred to as the filtered reconstructed block 221.

In an embodiment, the video encoder 20 (correspondingly, the loop filter unit 220) may be configured to output a loop filter parameter (such as a SAO filter parameter, an ALF filter parameters, or an LMCS parameter), for example, directly or after entropy encoding performed by the entropy encoding unit 270, so that, for example, the decoder 30 may receive and apply same or different loop filter parameters for decoding.

Decoder and Decoding Method

FIG. 3 shows an example of the video decoder 30 that is configured to implement the techniques of this application. The video decoder 30 is configured to receive encoded picture data 21 (for example, encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles) and associated syntax elements.

In the example shown in FIG. 3, the decoder 30 includes an entropy decoding unit 304, an inverse quantization unit 310, an inverse transform processing unit 312, a reconstruction unit 314 (for example, a summer 314), the loop filter 320, a decoded picture buffer (DBP) 330, a mode application unit 360, the inter prediction unit 344 and the intra prediction unit 354. The inter prediction unit 344 may be or include a motion compensation unit. In some examples, the video decoder 30 may perform a decoding process generally reciprocal to the encoding process described with respect to the video encoder 100 shown in FIG. 2.

Refer to FIG. 3, the loop filtering module is a trained target model (also referred to as a neural network). The neural network is configured to process an input picture or a picture area or a picture block, to generate a filtered picture or picture area or picture block. For example, a neural network for loop filtering is configured to receive an input picture or picture area or picture block, for example, input picture data shown in FIG. 6a to FIG. 6c, and generate a filtered picture or picture area or picture block. The following describes in detail the neural network for loop filtering with reference to FIG. 7a to FIG. 7e.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 also form the "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 are correspondingly applicable to the respective units and functions of the video decoder 30.

Inverse Quantization

The inverse quantization unit 310 may be configured to receive a quantization parameter (QP) (or in general information related to the inverse quantization) and a quantized coefficient from the encoded picture data 21 (for example, by parsing and/or decoding, for example, by the entropy decoding unit 304) and to apply, based on the quantization parameter, an inverse quantization on the decoded quantized coefficient 309 to obtain a dequantized coefficient 311. The dequantized coefficient 311 may also be referred to as a transform coefficient 311. The inverse quantization process may include use of a quantization parameter determined by the video encoder 20 for each video block in the video slice to determine a degree of quantization and, likewise, a degree of inverse quantization that should be applied.

Reconstruction

The reconstruction unit 314 (for example, the summer 314) is configured to add the reconstructed residual block 313 to the prediction block 365 to obtain a reconstructed block 315 in the pixel domain, for example, by adding the pixel values of the reconstructed residual block 313 and the pixel values of the prediction block 365.

Filtering

The loop filter unit 320 (either in a coding loop or after the coding loop) is configured to filter the reconstructed block 315 to obtain a filtered block 321, to smoothly perform pixel transitions or improve the video quality. The loop filter unit 320 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. The order of the filtering process may be the deblocking filter, the SAO filter and the ALF filter. In another example, a process called luminance mapping with chroma scaling (LMCS) (namely, the adaptive in-loop reshaper) is added. This process is performed before deblocking. In another example, the deblocking filter process may be also applied to internal sub-block edges, for example, affine sub-block edges, ATMVP sub-block edges, sub-block transform (SBT) edges and intra sub-partition (ISP) edges. Although the loop filter unit 320 is shown as an in-loop filter in FIG. 3, in other configurations, the loop filter unit 320 may be implemented as a post-loop filter.

The decoder 30 is configured to output the decoded picture 331, for example, via an output 332, for presentation or viewing to a user.

Although embodiments of the present invention have been primarily described based on video coding, it should be noted that embodiments of the coding system 10, the encoder 20 and the decoder 30 and the other embodiments described herein may also be configured for still picture processing or coding, that is, the processing or coding of an individual picture independent of any preceding or consecutive picture as in video coding. In general only inter prediction units 244 (encoder) and 344 (decoder) may not be available in case the picture processing is limited to a single picture 17. All other functionalities (also referred to as tools or technologies) of the video encoder 20 and video decoder 30 may equally be used for still picture processing, for example, residual calculation 204/304, transform processing unit 206, quantization unit 208, inverse quantization unit 210/310, (inverse) transform 212/312, partitioning 262/362, intra prediction 254/354, and/or loop filter 220/320, and entropy encoding 270 and entropy decoding unit 304.

Figure 4:
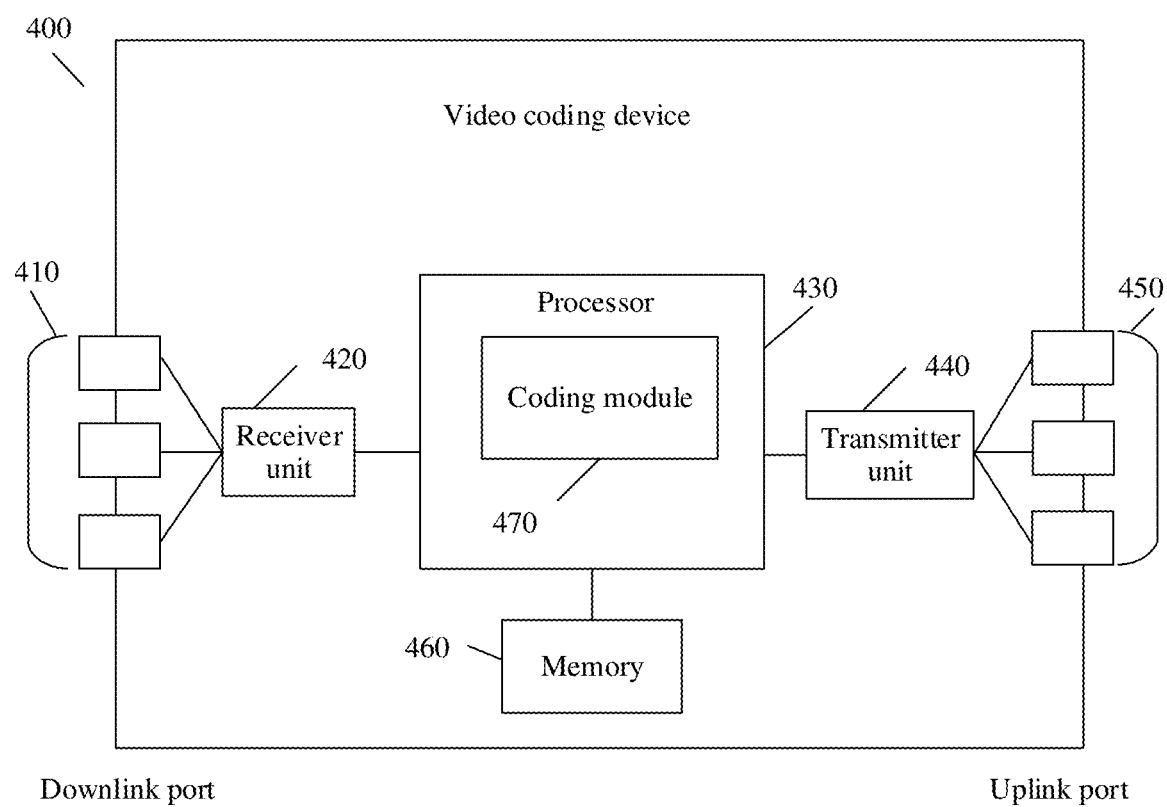
FIG. 4 is a block diagram illustrating a video coding apparatus configured to implement embodiments of the present invention.

FIG. 4 is a schematic diagram of a video coding device 400 according to an embodiment of the present invention. The video coding device 400 is suitable for implementing the disclosed embodiments as described herein. In an embodiment, the video coding device 400 may be a decoder such as the video decoder 30 in FIG. 1A or an encoder such as the video encoder 20 in FIG. 1A.

The video coding device 400 includes ingress ports 410 (or input ports 410) and receiver units (Rx) 420 for receiving data; a processor, a logic unit, or a central processing unit (CPU) 430 for processing the data, for example, the processor 430 may be a neural network processing unit 430; transmitter units (Tx) 440 and egress ports 450 (or output ports 450) for transmitting the data; and a memory 460 for storing the data. The video coding device 400 may also include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (for example, a multi-core processor), FPGAS, ASICs, and DSPs. The processor 430 is in communication with the ingress ports 410, the receiver units 420, the transmitter units 440, the egress ports 450, and the memory 460. The processor 430 includes a coding module 470 (for example, a neural network (NN)-based coding module 470). The coding module 470 implements the disclosed embodiments described above. For instance, the coding module 470 implements, processes, prepares, or provides the various coding operations. Therefore, the coding module 470 provides a substantial improvement to functions of the video coding device 400 and affects a switching of the video coding device 400 to a different state. Alternatively, the coding module 470 is implemented as instructions stored in the memory 460 and executed by the processor 430.

The memory 460 may include one or more disks, tape drives, and solid-state drives and may be used as an overflow data storage device, to store programs when such programs are selected for execution, and to store instructions and data that are read during program execution. The memory 460 may be volatile and/or non-volatile and may be a read-only memory (ROM), a random access memory (RAM), a ternary content-addressable memory (TCAM), and/or a static random-access memory (SRAM).

FIG. 5 is a simplified block diagram of an apparatus 500 that may be used as either or both of the source device 12 and the destination device 14 in FIG. 1A according to an example embodiment.

A processor 502 in the apparatus 500 can be a central processing unit. Alternatively, the processor 502 can be any other kind of device, or a plurality of devices, capable of manipulating or processing information now-existing or hereafter developed. As shown in figure, although the disclosed implementations may be practiced by using a single processor such as the processor 502, advantages in speed and efficiency may be achieved by using more than one processor.

A memory 504 in the apparatus 500 can be a read only memory (ROM) device or a random access memory (RAM) device in an implementation. Any other suitable kind of storage device can be used as the memory 504. The memory 504 may include code and data 506 that are accessed by the processor 502 through a bus 512. The memory 504 may further include an operating system 508 and an application program 510. The application program 510 includes at least one program that allows the processor 502 to perform the method described here. For example, the application program 510 may include applications 1 to N, and further include a video coding application that performs the method described here.

The apparatus 500 may further include one or more output devices, such as a display 518. The display 518 may be, in one example, a touch sensitive display that combines a display with a touch sensitive element that is operable to sense touch inputs. The display 518 may be coupled to the processor 502 through the bus 512.

Although depicted here as a single bus, the bus 512 of the apparatus 500 may include a plurality of buses. Further, a secondary storage may be directly coupled to another component of the apparatus 500 or may be accessed via a network and may include a single integrated unit such as a memory card or a plurality of units such as a plurality of memory cards. The apparatus 500 can thus be implemented in a wide variety of configurations.

Embodiments of this application relate to application of a neural network. For ease of understanding, the following first explains some nouns or terms used in embodiments of this application. The nouns or terms are also used as a part of content of the present invention.

(1) Neural Network

A neural network (NN) is a machine learning model. The neural network may include neurons. The neuron may be an operation unit that uses xs and an intercept of 1 as inputs, where an output of the operation unit may be as follows:

$$h_{W,b}(x) = f(W^T x) = f\left(\sum_{s=1}^{n} W_s x_s + b\right) \quad (1\text{-}1)$$

s=1, 2, . . . , or n, n is a natural number greater than 1, Ws is a weight of $x_s$, b is bias of the neuron, and f is an activation function of the neuron, and is used to introduce a non-linear feature into the neural network to convert an input signal in the neuron into an output signal. The output signal of the activation function may be used as input of a next convolutional layer. The activation function may be a sigmoid function. The neural network is a network formed by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. There is no special metric for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is definitely connected to any neuron in an $(i+1)^{th}$ layer. Although the DNN seems complex, it is not complex in terms of work at each layer. Simply speaking, the DNN is the following linear relationship expression: $\vec{y} = \alpha(W\vec{x} + \vec{b})$, where $\vec{x}$ is an input vector, $\vec{y}$ is an output vector, $\vec{b}$ is an offset vector, W is a weight matrix (also referred to as a coefficient), and $\alpha()$ is an activation function. At each layer, only such a simple operation is performed on the input vector $\vec{x}$ to obtain the output vector $\vec{y}$. Because the DNN includes a large quantity of layers, there are a large quantity of coefficients W and a large quantity of offset vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $w_{24}^3$. The superscript 3 represents the layer at which the coefficient W is located, and the subscript corresponds to the output third-layer index 2 and the input second-layer index 4. In conclusion, a coefficient from the $k^{th}$ neuron at the $(L-1)^{th}$ layer to the $j^{th}$ neuron at the $L^{th}$ layer is defined as $W_{jk}^L$. It should be noted that there is no parameter W at the input layer. In the deep neural network, more hidden layers make the network more capable of describing a complex case in the real world. Theoretically, a model with more parameters is more complex, and has a larger "capacity", which means that the model can complete a more complex learning task. Training the deep neural network is a process of learning a weight matrix, and a final objective of the training is to obtain a weight matrix of all layers of the trained deep neural network (a weight matrix formed by vectors W at a plurality of layers).

(3) Convolutional Neural Network

A convolutional neural network (CNN) is a deep neural network with a convolutional structure, and is a deep learning architecture. In the deep learning architecture, multi-layer learning is performed at different abstract levels by using a machine learning algorithm. As a deep learning architecture, the CNN is a feed-forward artificial neural network. Each neuron in the feed-forward artificial neural network may respond to a picture input to the neural network. The convolutional neural network includes a feature extractor constituted by a convolutional layer and a pooling layer. The feature extractor may be considered as a filter. A convolution process may be considered as using a trainable filter to perform convolution on an input picture or a convolutional feature map.

The convolutional layer is a neuron layer that is in the convolutional neural network and at which convolution processing is performed on an input signal. The convolutional layer may include a plurality of convolution operators. The convolution operator is also referred to as a kernel. In picture processing, the convolution operator functions as a filter that extracts specific information from an input picture matrix. The convolution operator may be a weight matrix essentially, and the weight matrix is usually predefined. In a process of performing a convolution operation on a picture, the weight matrix is usually used to process pixels at a granularity of one pixel (or two pixels, depending on a value of a stride) in a horizontal direction on the input picture, to extract a specific feature from the picture. A size of the weight matrix should be related to a size of the picture. It should be noted that a depth dimension of the weight matrix is the same as a depth dimension of the input picture. During a convolution operation, the weight matrix extends to an entire depth of the input picture. Therefore, convolution with a single weight matrix generates a convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional picture. The dimension herein may be understood as being determined based on the foregoing "plurality". Different weight matrices may be used to extract different features from the picture. For example, one weight matrix is used to extract edge information of the picture, another weight matrix is used to extract a specific color of the picture, and a further weight matrix is used to blur unneeded noise in the picture. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix formed by using the weight values obtained through training may be used to extract information from the input picture, to enable the convolutional neural network to perform correct prediction. When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a small size. The average pooling operator may be used to calculate pixel values in the picture in a specific range, to generate an average value. The average value is used as a result of average pooling. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each pixel in the picture output from the pooling layer represents an average value or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input picture are reduced. However, to generate final output information (required class information or other related information), the convolutional neural network needs to use the neural network layer to generate an output of one required type or a group of required types. Therefore, the neural network layer may include a plurality of hidden layers. Parameters included in the plurality of hidden layers may be obtained through pre-training based on related training data of a specific task type. For example, the task type may include picture recognition, picture classification, and super-resolution picture reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, back propagation is started to update a weight value and a deviation of each layer mentioned above, to reduce a loss of the convolutional neural network and an error between a result output by the convolutional neural network by using the output layer and an ideal result.

(4) Recurrent Neural Network

A recurrent neural network (RNN) is used to process sequence data. A conventional neural network model starts from an input layer to a hidden layer and then to an output layer, and the layers are fully connected, while nodes in each layer are unconnected. Although this ordinary neural network resolves a plurality of problems, it is still incompetent to a plurality of problems. For example, if it is expected to predict a next word in a sentence, a preceding word usually needs to be used, because words in a sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and an input and an output are also independent, such as a cat and a dog. However, many elements are interconnected in the real world. For example, stocks change over time. For another example, a person says: I like traveling, my favorite place is Yunnan, and I will go there in the future if there is a chance. Herein, people should know that the person will go to "Yunnan". Because people perform inference from the context. However, how do machines do that? However, the RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(7) Generative Adversarial Network

The generative adversarial network (GAN) is a deep learning model. The model includes at least two modules: One module is a generative model, and the other module is a discriminative model. The two modules are used to learn through gaming with each other, to generate a better output. Both the generative model and the discriminative model may be neural networks, and may specifically be deep neural networks or convolutional neural networks. A basic principle of the GAN is as follows: A GAN for generating a picture is used as an example. It is assumed that there are two networks: G (Generator) and D (Discriminator). G is a network for generating a picture. G receives random noise z, and generates the picture by using the noise, where the picture is denoted as G(z). D is a discriminator network used to determine whether a picture is "real". An input parameter of D is x, x represents a picture, and an output D(x) represents a probability that x is a real picture. If a value of D(x) is 1, it indicates that the picture is 100% real. If the value of D(x) is 0, it indicates that the picture cannot be real. In a process of training the generative adversarial network, an objective of the generative network G is to generate a picture that is as real as possible to deceive the discriminative network D, and an objective of the discriminative network D is to distinguish between the picture generated by G and a real picture as much as possible. In this way, G and D form a dynamic "game" process, to be specific, "adversary" in the "generative adversarial network". A final gaming result is that in an ideal state, G may generate a picture G(z) that is to be difficultly distinguished from a real picture, and it is difficult for D to determine whether the picture generated by G is real, to be specific, D(G(z))=0.5. In this way, an excellent generative model G is obtained, and can be used to generate a picture.

The following describes in detail the target model (also referred to as the neural network) for loop filtering with reference to FIG. 7a to FIG. 7e. FIG. 7a to FIG. 7e show an example architecture of the target model (for example, the neural network for filtering, briefly referred to as the filtering network).

Figure 7A:
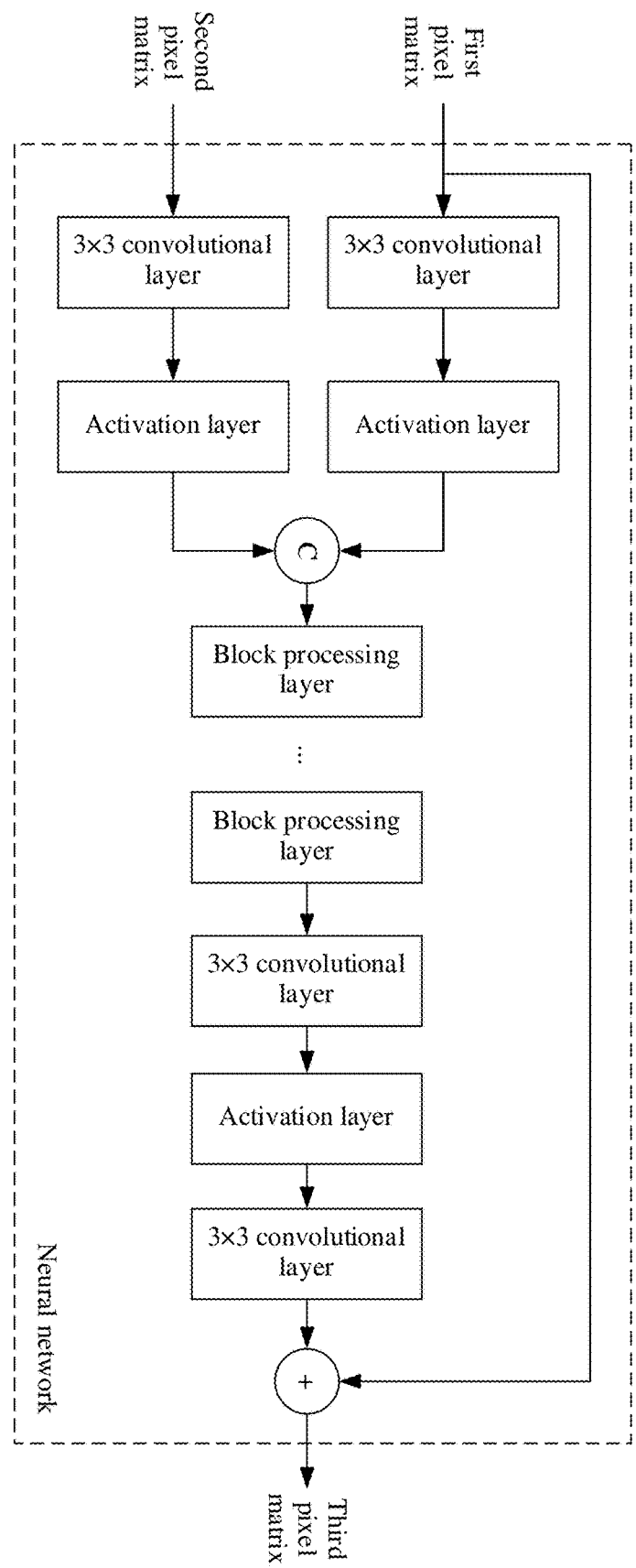
FIG. 7a to FIG. 7e are schematic diagrams of a trained neural network introduced into a loop filtering module according to an embodiment of this application.

As shown in FIG. 7a, a first pixel matrix (a value of a pixel at a corresponding location in the first pixel matrix corresponds to a luminance value of a pixel at a corresponding location in a reconstructed first picture block) and a second pixel matrix (a pixel at a corresponding location in the second pixel matrix corresponds to a quantization step value corresponding to the luminance value of the pixel at the corresponding location in the first picture block) are input to the filtering network. The filtering network processes the first pixel matrix by using a 3×3 convolutional layer (3×3Conv) and an activation layer (Relu), and processes the second pixel matrix by using another 3×3 convolutional layer and another activation layer. Two matrices obtained after the foregoing processing are combined (concat), and then a residual matrix is obtained by using a block processing layer (Res-Block), . . . , a block processing layer, a 3×3 convolutional layer, an activation layer, and a 3×3 convolutional layer. A pixel at a corresponding location in the residual matrix corresponds to a chroma residual value of a pixel at a corresponding location in a filtered second picture block. Pixel values at the corresponding locations in the first pixel matrix and the residual matrix are added to obtain a third pixel matrix. A pixel at a corresponding location in the third pixel matrix corresponds to a luminance value of the pixel at the corresponding location in the second picture block.

Figure 7B:
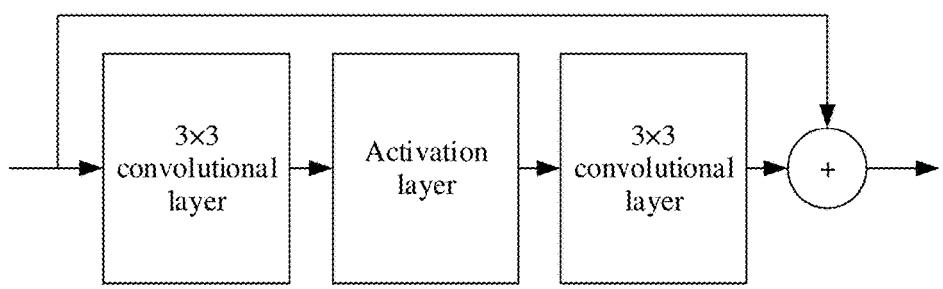
Figure 7C:
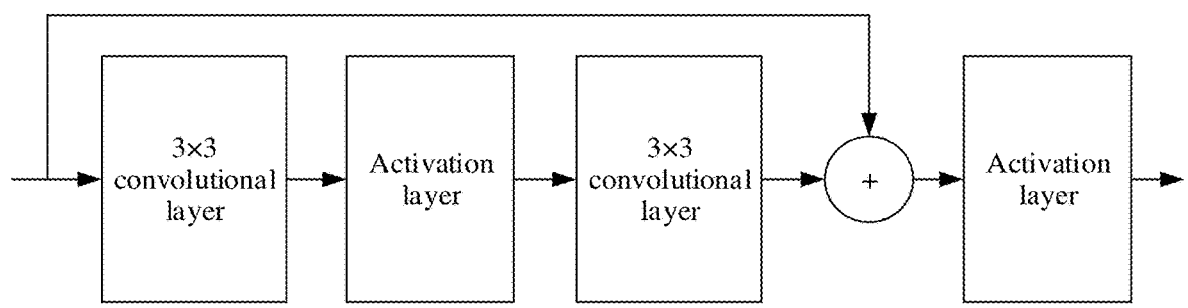

As shown in FIG. 7b, the block processing layer may include a 3×3 convolutional layer, an activation layer, and a 3×3 convolutional layer. After an input matrix is processed by using the three layers, pixel values at corresponding locations of the matrix obtained after the processing and the initial input matrix are added to obtain a final output matrix. As shown in FIG. 7c, the block processing layer may include a 3×3 convolutional layer, an activation layer, a 3×3 convolutional layer, and an activation layer. After an input matrix is processed by using the 3×3 convolutional layer, the activation layer, and the 3×3 convolutional layer, pixel values at corresponding locations of the matrix obtained after the processing and the initial input matrix are added to obtain a final output matrix by using an activation layer.

Figure 7D:
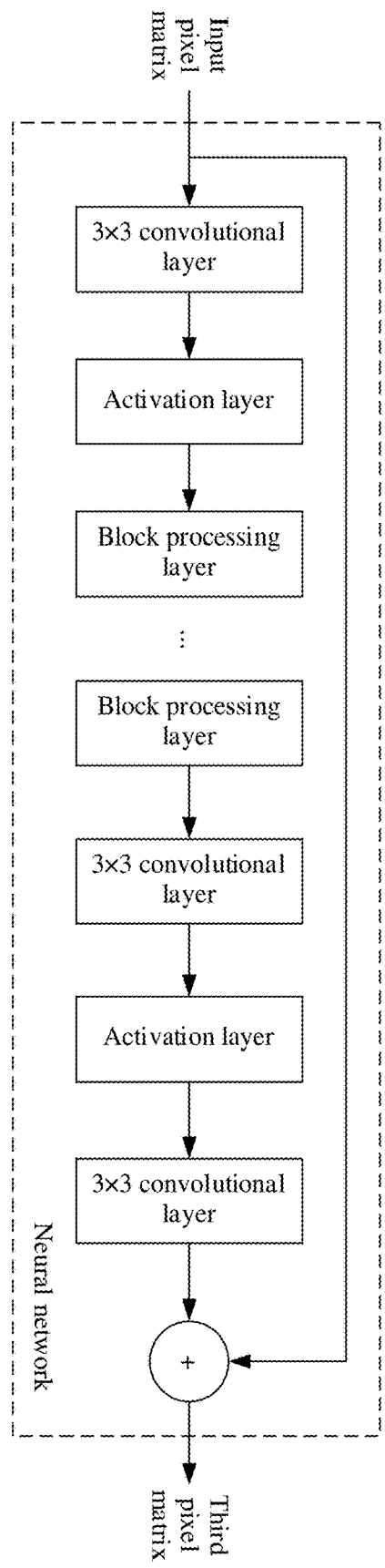

As shown in FIG. 7d, before the matrix is input to the filtering network, the pixel values at the corresponding locations in the first pixel matrix (the value of the pixel at the corresponding location in the first pixel matrix corresponds to the luminance value of the pixel at the corresponding location in the reconstructed first picture block) and the second pixel matrix (the pixel at the corresponding location in the second pixel matrix corresponds to the quantization step value corresponding to the luminance value of the pixel at the corresponding location in the first picture block) are first added or multiplied to obtain the input pixel matrix. Then, the input pixel matrix is input to the filtering network. The filtering network processes the input pixel matrix by using a 3×3 convolutional layer, an activation layer, a block processing layer, . . . , a block processing layer, a 3×3 convolutional layer, an activation layer, and a 3×3 convolutional layer, to obtain the third pixel matrix. The pixel at the corresponding location in the third pixel matrix corresponds to the luminance value of the pixel at the corresponding location in the second picture block.

Figure 7E:
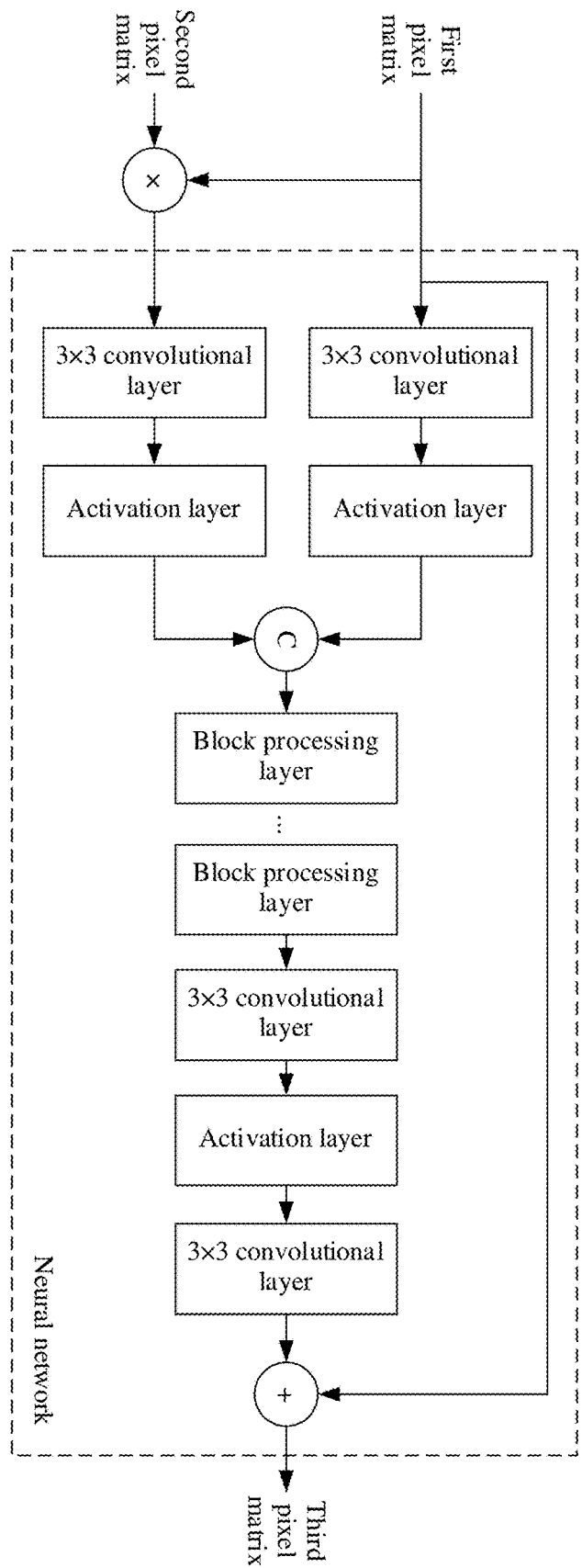

As shown in FIG. 7e, the first pixel matrix (the value of the pixel at the corresponding location in the first pixel matrix corresponds to the luminance value of the pixel at the corresponding location in the reconstructed first picture block) is input to the filtering network, and the pixel matrix obtained by multiplying the pixel values at the corresponding locations in the first pixel matrix and the second pixel matrix (the pixel at the corresponding location in the second pixel matrix corresponds to the quantization step value corresponding to the luminance value of the pixel at the corresponding location in the first picture block) is also input to the filtering network. The filtering network processes one input by using a 3×3 convolutional layer and an activation layer, and processes another input by using another 3×3 convolutional layer and another activation layer. Two matrices obtained after the foregoing processing are combined (concat), and then a residual matrix is obtained by using a block processing layer, . . . , a block processing layer, a 3×3 convolutional layer, an activation layer, and a 3×3 convolutional layer. A pixel at a corresponding location in the residual matrix corresponds to a chroma residual value of a pixel at a corresponding location in a filtered second picture block. The pixel values at the corresponding locations in the first pixel matrix and the residual matrix are added to obtain the third pixel matrix. The pixel at the corresponding location in the third pixel matrix corresponds to the luminance value of the pixel at the corresponding location in the second picture block.

It should be noted that the convolutional neural networks shown in FIG. 7a to FIG. 7e are merely used as several examples of a convolutional neural network. In a specific application, the convolutional neural network may alternatively be in a form of another network model. This is not specifically limited in this application.

Figure 8:
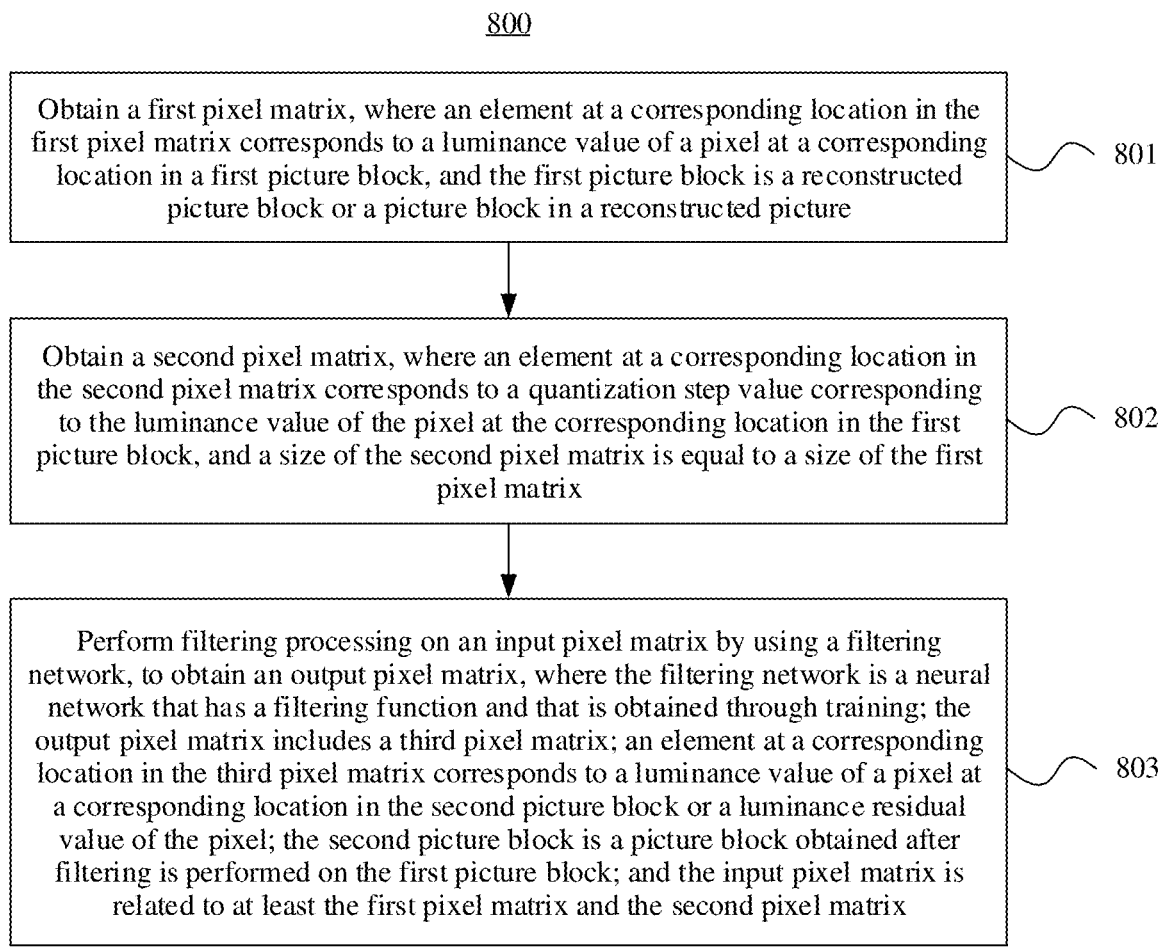
FIG. 8 is a flowchart of a process 800 of a loop filtering method according to an embodiment of this application.

FIG. 8 is a flowchart of a process 800 of a loop filtering method according to an embodiment of this application. The process 800 may be performed by the video encoder 20 or the video decoder 30, and specifically, may be performed by the loop filter 220 of the video encoder 20 or the loop filter 320 of the video decoder 30. The process 800 is described as a series of steps or operations. It should be understood that the steps or operations of the process 800 may be performed in various sequences and/or simultaneously, and are not limited to an execution sequence shown in FIG. 8. It is assumed that a video data stream with a plurality of video frames uses the video encoder or the video decoder, the process 800 including the following steps is performed to perform filtering processing on a reconstructed picture or picture block. The process 800 may include the following steps.

Step 801: Obtain a first pixel matrix. An element at a corresponding location in the first pixel matrix corresponds to a luminance value of a pixel at a corresponding location in a first picture block. The first picture block is a reconstructed picture block or a picture block in a reconstructed picture.

A picture block (for example, the first picture block) may be a reconstructed picture obtained after inverse quantization and reconstruction are performed on an encoding result of a picture in an encoder, or may be a picture block in the reconstructed picture, or may be a reconstructed picture block obtained after inverse quantization and reconstruction are performed on an encoding result of the picture block.

A picture block (for example, the first picture block) may be understood as a pixel matrix X. An element at a corresponding location in the pixel matrix X may be understood as a pixel (or a pixel value, for example, the pixel value includes a luminance value of the pixel or a chroma value of the pixel) at a corresponding location in the picture block. In an example, a size of the picture block is 64×64, which indicates that pixels of the picture block are distributed in 64 rows×64 columns, and x(i, j) represents a pixel (or a pixel value) in an $i^{th}$ row and a $j^{th}$ column in the picture block. Correspondingly, an input pixel matrix A includes 64 rows and 64 columns, and there are 64×64 elements in total. A(i, j) represents an element in an $i^{th}$ row and a $j^{th}$ column in the pixel matrix A. A(i, j) corresponds to x(i, j) (for example, A(i, j) represents a value of the pixel x(i, j)). An element at a corresponding location in the input pixel matrix A corresponds to (for example, represents) a luminance value of the pixel at the corresponding location in the picture block, that is, indicates that a value of the element A(i, j) is a luminance value of the pixel x(i, j). Optionally, in another example, an element at a corresponding location in the input pixel matrix A may alternatively correspond to (for example, represent) another value of the pixel at the corresponding location in the picture block, that is, a value of the element A(i, j) may be another value of the pixel x(i, j), for example, a quantization step value (as described in step 802) corresponding to the luminance value of the pixel x(i, j); for another example, a chroma value (as described below) of the pixel x(i, j); for another example, a quantization step value (as described below) corresponding to the chroma value of the pixel x(i, j); for another example, a luminance residual value (as described below) of the pixel x(i, j); for another example, a chroma residual value (as described below) of the pixel x(i, j). This is not specifically limited in this application. It should be understood that when the element at the corresponding location in the input pixel matrix A represents the luminance value of the pixel at the corresponding location in the picture block, the input pixel matrix A is an example of the foregoing first pixel matrix. Alternatively, when the element at the corresponding location in the input pixel matrix A represents the quantization step value corresponding to the luminance value of the pixel at the corresponding location in the picture block, the input pixel matrix A is an example of the following second pixel matrix. It should be understood that when the element at the corresponding location in the input pixel matrix A represents the chroma value of the pixel at the corresponding location in the picture block, the input pixel matrix A is an example of the following fifth pixel matrix. Alternatively, when the element at the corresponding location in the input pixel matrix A represents the quantization step value corresponding to the chroma value of the pixel at the corresponding location in the picture block, the input pixel matrix A is an example of the following sixth pixel matrix.

The first picture block may be a picture block in a reconstructed picture reconstructed by the encoder or the decoder, or may be a reconstructed picture block reconstructed by the encoder or the decoder. The loop filtering method in this embodiment includes but is not limited to performing filtering processing on the reconstructed picture block. It should be understood that the loop filtering method is also applicable to performing filtering processing on the reconstructed picture, that is, the "reconstructed picture block" in the method in this embodiment is adaptively replaced with the reconstructed picture. Details are not described herein again.

It should be noted that the first picture block and a second picture block in step 803 may further use an RGB format. In this case, the element at the corresponding location in the first pixel matrix may correspond to (for example, represent) an R value, a G value, or a B value of the pixel at the corresponding location in the first picture block, an element at a corresponding location in the second pixel matrix may correspond to (for example, represent) a quantization step value corresponding to the R value, the G value, or the B value of the pixel at the corresponding location in the first picture block, or a quantization step value jointly used by the R value, the G value, and the B value.

Step 802: Obtain the second pixel matrix. The element at the corresponding location in the second pixel matrix corresponds to the quantization step value corresponding to the luminance value of the pixel at the corresponding location in the first picture block. A size of the second pixel matrix is equal to a size of the first pixel matrix.

A process in which the encoder encodes the first picture block includes a quantization operation on residual information. The process relates to a quantization step value, and each pixel in the first picture block corresponds to one quantization step value. The element in the second pixel matrix is used to represent the foregoing quantization step value. In this application, when the filtering network is used to implement filtering, a quantization step value of each pixel of the reconstructed picture block is introduced, so that filtering processing can be better performed on a pixel matrix that is input to the filtering network and that corresponds to the picture block. Therefore, filtering effect is improved.

Step 803: Perform filtering processing on the input pixel matrix by using the filtering network, to obtain an output pixel matrix. The filtering network is a neural network that has a filtering function and that is obtained through training. The output pixel matrix includes a third pixel matrix. An element at a corresponding location in the third pixel matrix corresponds to a luminance value of a pixel at a corresponding location in the second picture block or a luminance residual value of the pixel. The second picture block is a picture block obtained after filtering is performed on the first picture block. The input pixel matrix is related to at least the first pixel matrix and the second pixel matrix.

In a possible implementation, the input pixel matrix includes the first pixel matrix and the second pixel matrix. Alternatively, the input pixel matrix is a first preprocessed matrix obtained by preprocessing the first pixel matrix and the second pixel matrix. Alternatively, the input pixel matrix includes a normalized matrix of the first pixel matrix and a normalized matrix of the second pixel matrix. Alternatively, the input pixel matrix is a second preprocessed matrix obtained by preprocessing a normalized matrix of the first pixel matrix and a normalized matrix of the second pixel matrix. The normalized matrix is a matrix obtained by performing normalization processing on a value of an element at a corresponding location in a corresponding matrix.

The input pixel matrix is a processing object of the filtering network. The input pixel matrix may include the obtained first pixel matrix and the obtained second pixel matrix, that is, the two pixel matrices are directly input to the filtering network for filtering processing.

Before being input to the filtering network, the input pixel matrix may also be a pixel matrix obtained by performing preprocessing and/or normalization processing on one or more pixel matrices based on a training data form of the filtering network during training and a processing capability of the filtering network. An objective of normalization processing is to adjust values of elements to a unified value range, for example, [0, 1] or [−0.5, 0.5]. This can improve operation efficiency in calculation of the filtering network. The preprocessing may include matrix addition, matrix multiplication, matrix combination (concat), and the like. This can reduce a calculation amount of the filtering network. Therefore, the input pixel matrix may include the normalized matrix of the first pixel matrix and the normalized matrix of the second pixel matrix. To be specific, normalization processing is separately performed on the first pixel matrix and the second pixel matrix, and then the normalized matrices of the first pixel matrix and the second pixel matrix are input to the filtering network for processing. Alternatively, the input pixel matrix may be a preprocessed matrix obtained after addition, multiplication, or combination is performed on the first pixel matrix and the second pixel matrix. Alternatively, the input pixel matrix may be a preprocessed matrix obtained after addition, multiplication, or combination is performed on the normalized matrix of the first pixel matrix and the normalized matrix of the second pixel matrix.

Matrix addition indicates that values of elements at corresponding locations in two matrices are added. Matrix multiplication indicates that values of elements at corresponding locations in two matrices are multiplied. Matrix combination (concat) indicates that a quantity of channels of a matrix is increased. For example, one matrix is a two-dimensional matrix whose size is m×n, and the other matrix is also a two-dimensional matrix whose size is also m×n. The two matrices are combined to obtain a three-dimensional matrix whose size is m×n×2.

As described in the step 801, an output pixel matrix B output by the filtering network corresponds to a filtered picture block (for example, the second picture block), that is, an element B(i, j) in the output pixel matrix corresponds to a pixel y(i, j) in the filtered picture block. In an example, a value of the element B(i, j) may represent a luminance value of the pixel y(i, j). Optionally, in another example, an element at a corresponding location in the pixel matrix B may alternatively correspond to (for example, represent) another value of a pixel at a corresponding location in the filtered picture block, that is, a value of the element B(i, j) may be another value of the pixel y(i, j), for example, a luminance residual value of the pixel y(i, j); for another example, a chroma value of the pixel y(i, j); for another example, a chroma residual value of the pixel y(i, j). This is not specifically limited in this application. It should be understood that when the element at the corresponding location in the output pixel matrix B represents the luminance value of the pixel at the corresponding location in the filtered picture block, the output pixel matrix B is an example of the third pixel matrix. Alternatively, when the element at the corresponding location in the output pixel matrix B represents the luminance residual value of the pixel at the corresponding location in the filtered picture block, the output pixel matrix B is another example of the third pixel matrix. It should be understood that when the element at the corresponding location in the output pixel matrix B represents the chroma value of the pixel at the corresponding location in the filtered picture block, the output pixel matrix B is an example of a seventh pixel matrix. Alternatively, when the element at the corresponding location in the output pixel matrix B represents the chroma residual value of the pixel at the corresponding location in the filtered picture block, the output pixel matrix B is an example of an eighth pixel matrix.

Figure 9A:
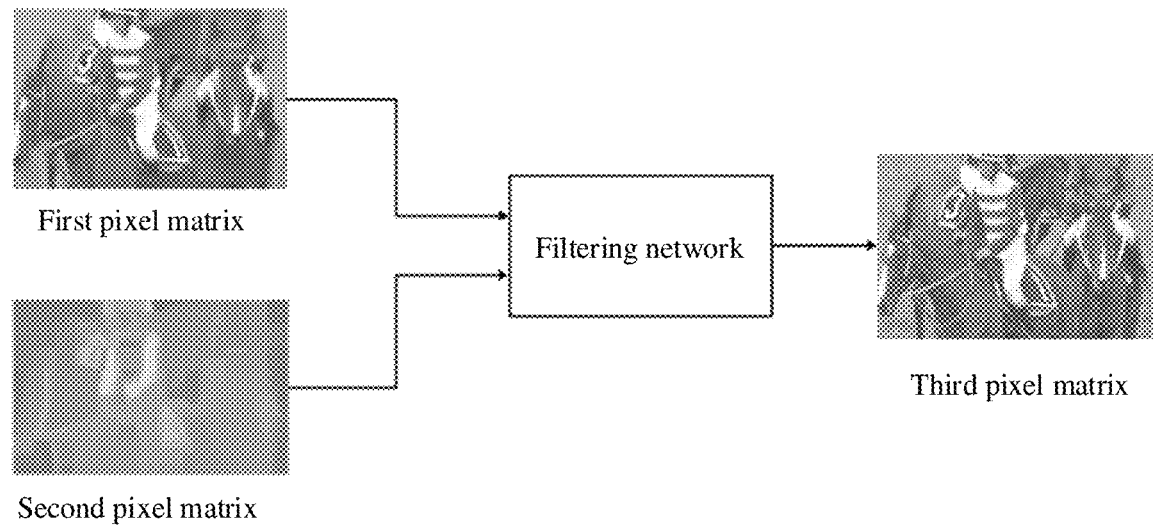
Figure 9B:
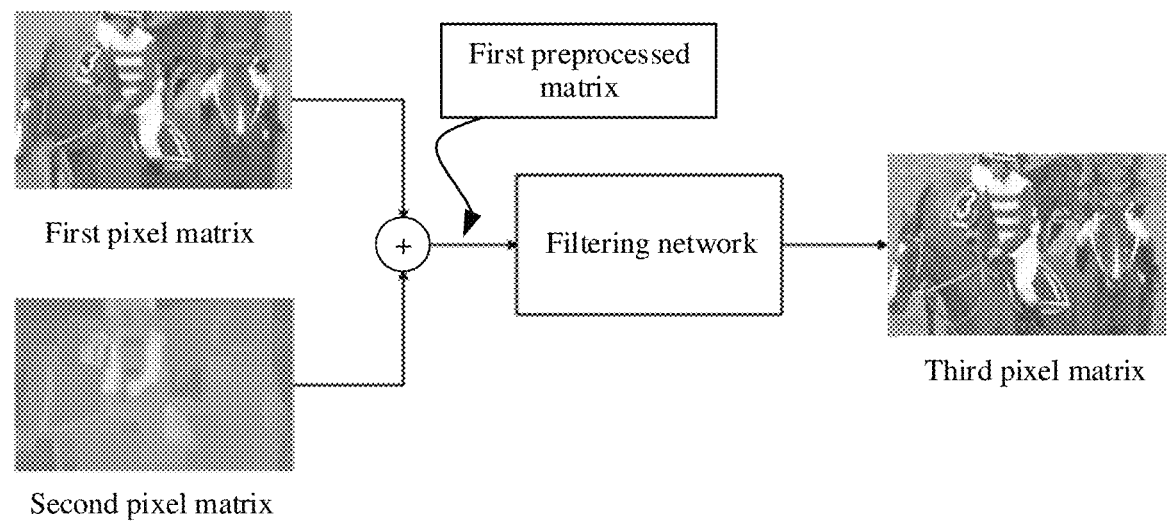
Figure 9C:
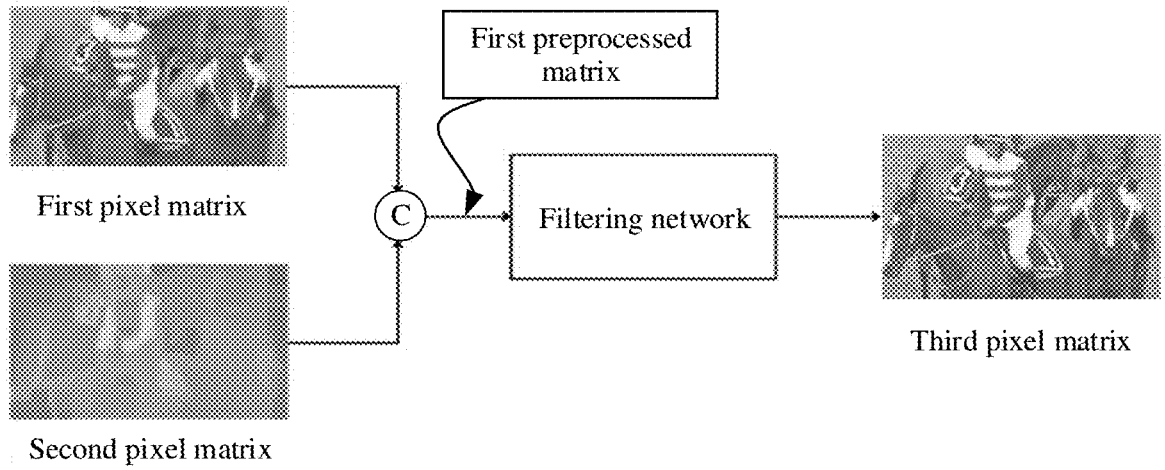
Figure 9D:
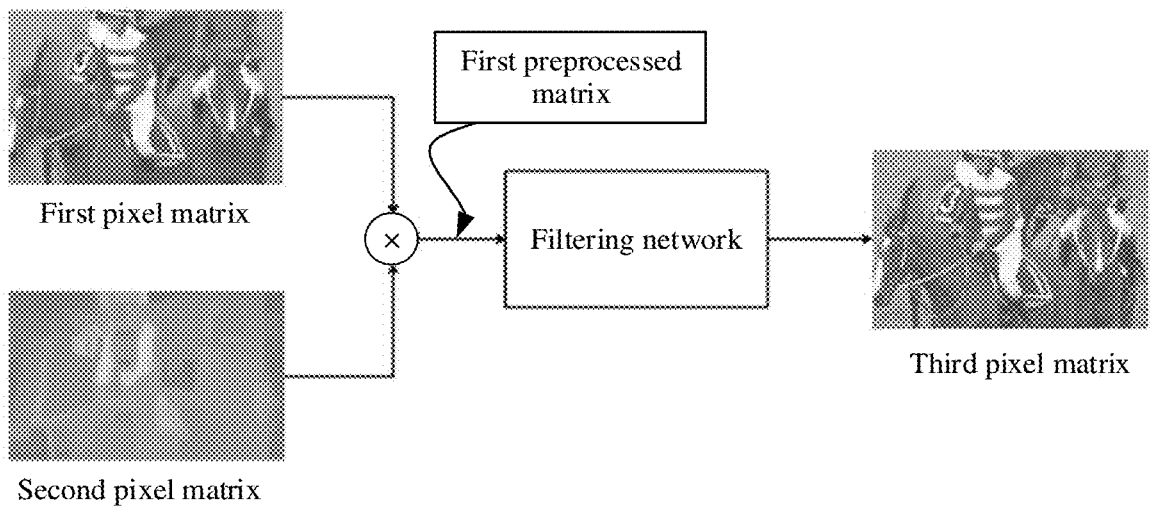

When the first pixel matrix and the second pixel matrix are obtained, the input pixel matrix may include the first pixel matrix and the second pixel matrix, as shown in FIG. 9a, alternatively, the input pixel matrix may be a matrix obtained based on at least the first pixel matrix and the second pixel matrix, as shown in FIG. 9b, FIG. 9c, or FIG. 9d.

In a possible implementation, if normalization processing is performed on the first pixel matrix and the second pixel matrix in an input phase of the filtering network, for example, values of pixels in the first pixel matrix range from 0 to 255, and these values may be normalized to 0 to 1 or −0.5 to 0.5, that is, the input pixel matrix is a normalized matrix. In this case, denormalization processing needs to be performed on the third pixel matrix in an output phase of the filtering network. For example, values of elements in the third pixel matrix are denormalized to 0 to 255.

Figure 9E:
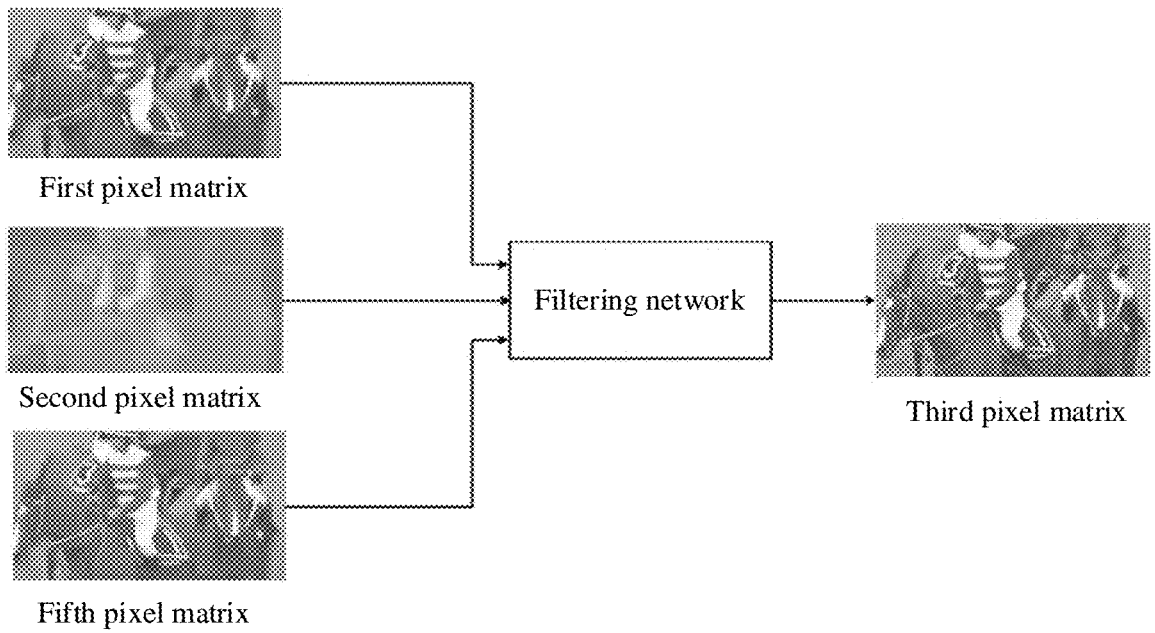
Figure 9F:
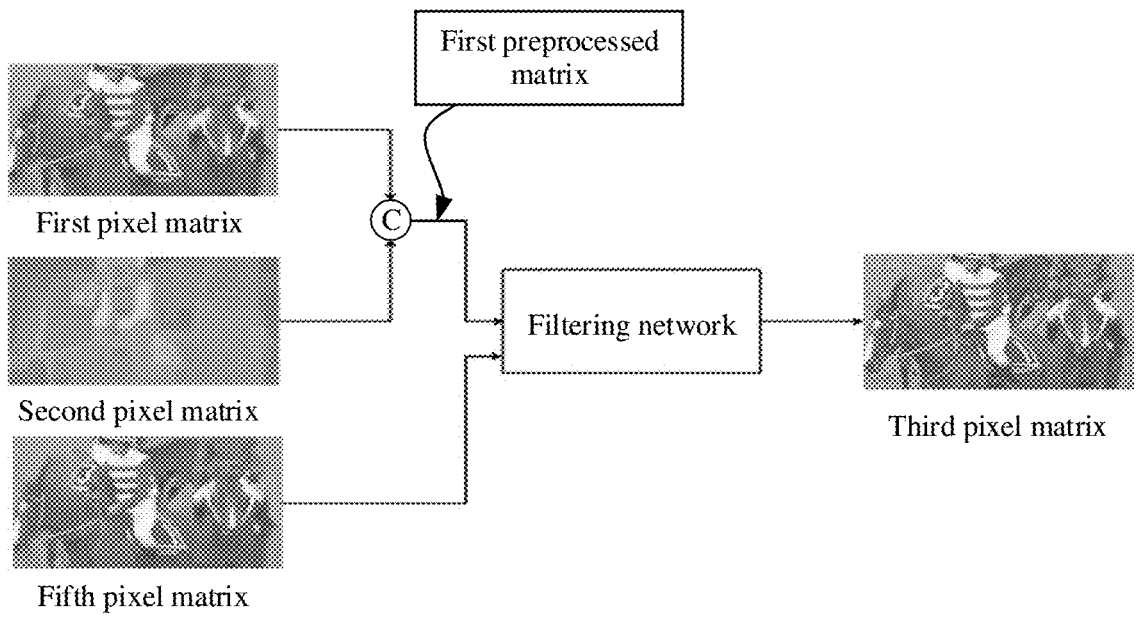

Based on the first pixel matrix and the second pixel matrix, the fifth pixel matrix (an element at a corresponding location in the fifth pixel matrix corresponds to a chroma value of the pixel at the corresponding location in the first picture block) may be further obtained. In this case, the input pixel matrix may include the first pixel matrix, the second pixel matrix, and the fifth pixel matrix, as shown in FIG. 9e. Alternatively, the input pixel matrix may include the fifth pixel matrix and the first preprocessed matrix that is obtained by preprocessing the first pixel matrix and the second pixel matrix, as shown in FIG. 9f.

Figure 9G:
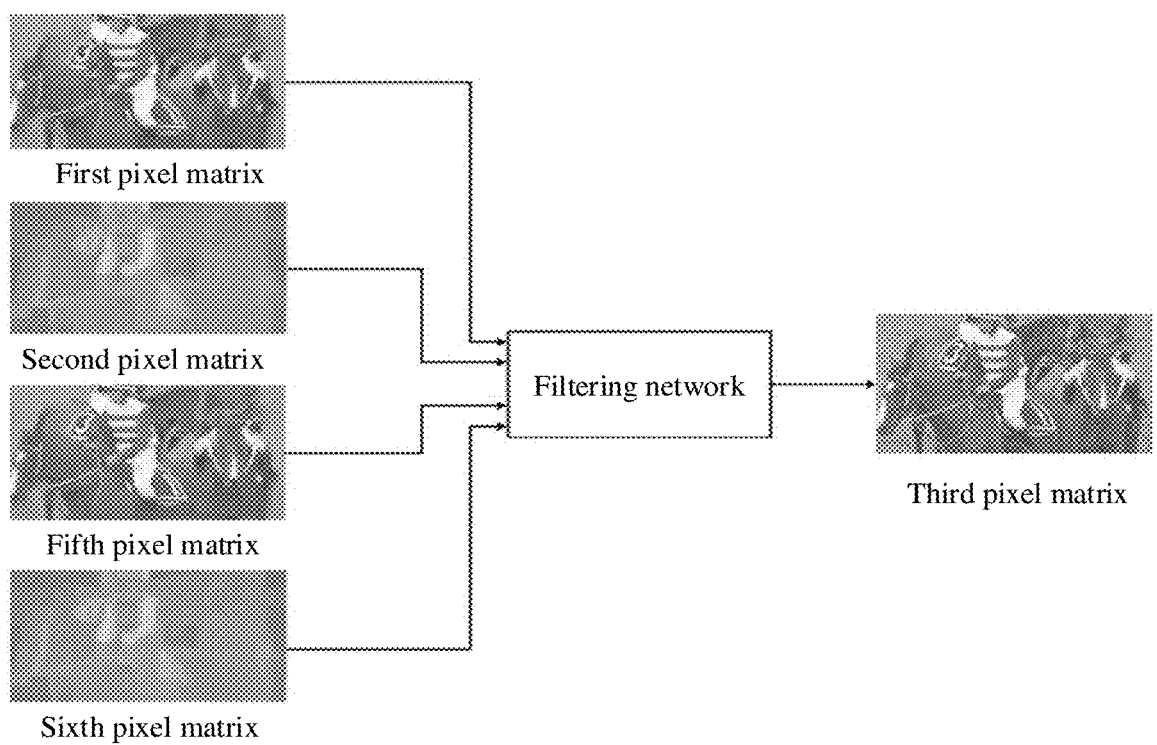
Figure 9H:
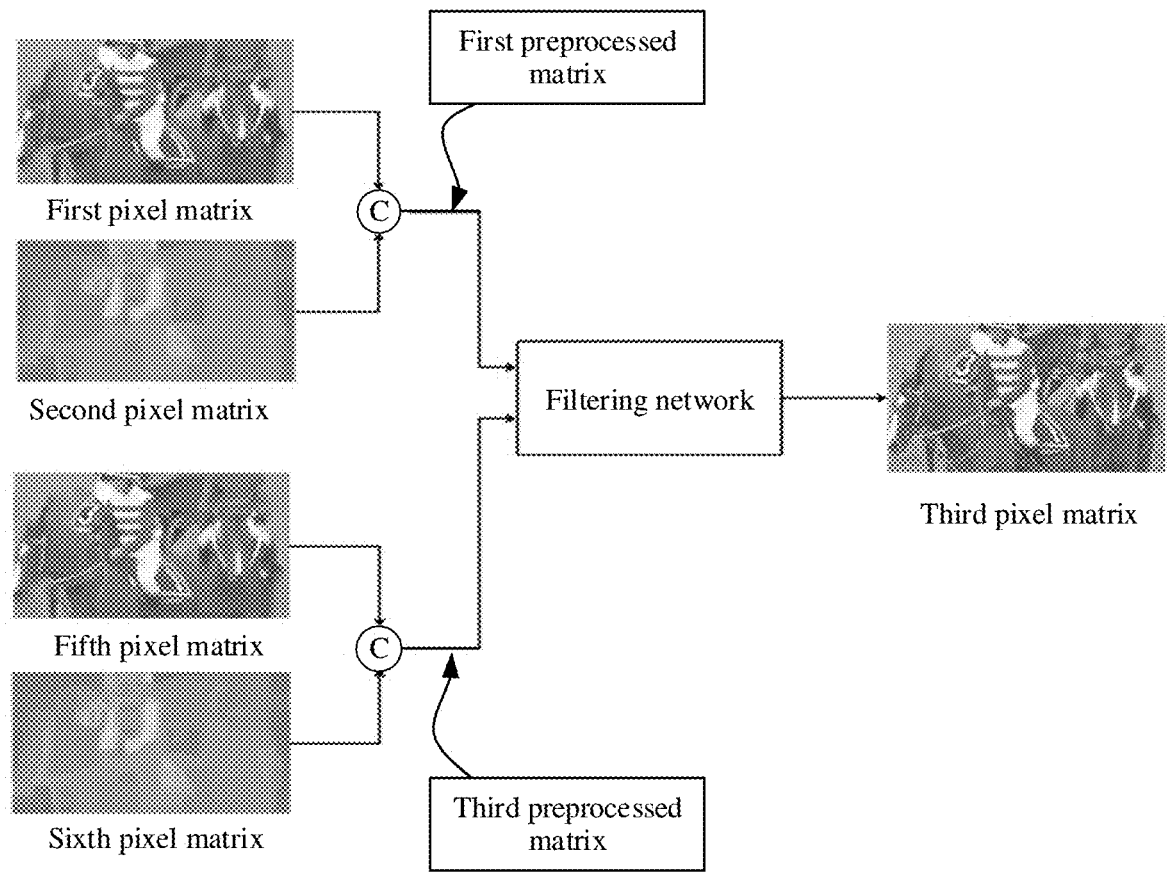

Based on the first pixel matrix, the second pixel matrix, and the fifth pixel matrix, the sixth pixel matrix (an element at a corresponding location in the sixth pixel matrix corresponds to a quantization step value corresponding to the chroma value of the pixel at the corresponding location in the first picture block) may be further obtained. In this case, the input pixel matrix may include the first pixel matrix, the second pixel matrix, the fifth pixel matrix, and the sixth pixel matrix, as shown in FIG. 9g. Alternatively, the input pixel matrix may include the first preprocessed matrix and a third preprocessed matrix that is obtained by preprocessing the fifth pixel matrix and the sixth pixel matrix, as shown in FIG. 9h. Alternatively, the input matrix may include the first preprocessed matrix, the fifth pixel matrix, and the sixth pixel matrix. Alternatively, the input pixel matrix may include the first pixel matrix, the second pixel matrix, and a third preprocessed matrix.

Similarly, if normalization processing is performed on the first pixel matrix, the second pixel matrix, the fifth pixel matrix, and the sixth pixel matrix in the input phase of the filtering network, for example, values of elements in the first pixel matrix is 0 to 255, these values may be normalized to 0 to 1 or −0.5 to 0.5, that is, the input pixel matrix is a normalized matrix. In this case, denormalization processing needs to be performed on the output pixel matrix in the output phase of the filtering network. For example, values of elements in the seventh pixel matrix are denormalized to 0 to 255.

FIG. 9a to FIG. 9l illustrate several examples of the input pixel matrix of the filtering network.

As shown in FIG. 9a, the first pixel matrix and the second pixel matrix are directly input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. In this case, the input pixel matrix includes the first pixel matrix and the second pixel matrix.

As shown in FIG. 9b, the first pixel matrix and the second pixel matrix are added and then input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. Values of the elements at the corresponding locations in the first pixel matrix and the second pixel matrix are added to obtain the N×M first preprocessed matrix. In this case, the input pixel matrix is the first preprocessed matrix. The input pixel matrix is input to the filtering network to perform a filtering operation. The output third pixel matrix is N×M, and the element at the corresponding location in the third pixel matrix may correspond to the luminance value or the luminance residual value of the pixel at the corresponding location in the second picture block.

As shown in FIG. 9c, the first pixel matrix and the second pixel matrix are combined and then input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. The first pixel matrix and the second pixel matrix are combined to obtain the N×M×2 first preprocessed matrix. In this case, the input pixel matrix is the first preprocessed matrix. The input pixel matrix is input to the filtering network to perform a filtering operation. The output third pixel matrix is N×M, and the element at the corresponding location in the third pixel matrix may correspond to the luminance value or the luminance residual value of the pixel at the corresponding location in the second picture block.

As shown in FIG. 9d, the first pixel matrix and the second pixel matrix are multiplied and then input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. Pixel values at the corresponding locations in the first pixel matrix and the second pixel matrix are multiplied to obtain the N×M first preprocessed matrix. In this case, the input pixel matrix is the first preprocessed matrix. The input pixel matrix is input to the filtering network to perform a filtering operation. The output third pixel matrix is N×M, and the element at the corresponding location in the third pixel matrix may correspond to the luminance value or the luminance residual value of the pixel at the corresponding location in the second picture block.

As shown in FIG. 9e, the first pixel matrix, the second pixel matrix, and the fifth pixel matrix are directly input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. The fifth pixel matrix is N×M, and the element at the corresponding location corresponds to the chroma value of the pixel at the corresponding location in the first picture block. In this case, the input pixel matrix includes the first pixel matrix, the second pixel matrix, and the fifth pixel matrix. The first pixel matrix, the second pixel matrix, and the fifth pixel matrix are input to the filtering network to perform a filtering operation. The output third pixel matrix is N×M, and the element at the corresponding location in the third pixel matrix corresponds to the luminance value or the luminance residual value of the pixel at the corresponding location in the second picture block. Optionally, the seventh pixel matrix or the eighth pixel matrix may be further output. An element at a corresponding location in the seventh pixel matrix corresponds to a chroma value of the pixel at the corresponding location in the second picture block. An element at a corresponding location in the eighth pixel matrix corresponds to a chroma residual value of the pixel at the corresponding location in the second picture block.

As shown in FIG. 9f, the first pixel matrix and the second pixel matrix are combined and then input to the filtering network, and the fifth pixel matrix is directly input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. The first pixel matrix and the second pixel matrix are combined to obtain the N×M×2 first preprocessed matrix. In this case, the input pixel matrix includes the first preprocessed matrix and the fifth pixel matrix. The input pixel matrix is input to the filtering network to perform a filtering operation. The output third pixel matrix is N×M, and the element at the corresponding location in the third pixel matrix may correspond to the luminance value or the luminance residual value of the pixel at the corresponding location in the second picture block. Optionally, the seventh pixel matrix or the eighth pixel matrix may be further output. An element at a corresponding location in the seventh pixel matrix corresponds to a chroma value of the pixel at the corresponding location in the second picture block. An element at a corresponding location in the eighth pixel matrix corresponds to a chroma residual value of the pixel at the corresponding location in the second picture block.

As shown in FIG. 9g, the first pixel matrix, the second pixel matrix, the fifth pixel matrix, and the sixth pixel matrix are directly input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. The fifth pixel matrix is N×M, and the element at the corresponding location corresponds to the chroma value of the pixel at the corresponding location in the first picture block. The sixth pixel matrix is N×M, and the element at the corresponding location corresponds to the quantization step value corresponding to the chroma value of the pixel at the corresponding location in the first picture block. In this case, the input pixel matrix includes the first pixel matrix, the second pixel matrix, the fifth pixel matrix, and the sixth pixel matrix. The first pixel matrix, the second pixel matrix, the fifth pixel matrix, and the sixth pixel matrix are input to the filtering network to perform a filtering operation. The output third pixel matrix N×M, and the element at the corresponding location in the third pixel matrix corresponds to the luminance value or the luminance residual value of the pixel at the corresponding location in the second picture block. Optionally, the seventh pixel matrix or the eighth pixel matrix may be further output. An element at a corresponding location in the seventh pixel matrix corresponds to a chroma value of the pixel at the corresponding location in the second picture block. An element at a corresponding location in the eighth pixel matrix corresponds to a chroma residual value of the pixel at the corresponding location in the second picture block. Optionally, the seventh pixel matrix or the eighth pixel matrix may be further output. An element at a corresponding location in the seventh pixel matrix corresponds to a chroma value of the pixel at the corresponding location in the second picture block. An element at a corresponding location in the eighth pixel matrix corresponds to a chroma residual value of the pixel at the corresponding location in the second picture block.

As shown in FIG. 9h, the first pixel matrix and the second pixel matrix are combined and then input to the filtering network, and the fifth pixel matrix and the sixth pixel matrix are combined and then input to the filtering network. For example, the first pixel matrix is N×M, and the element at the corresponding location corresponds to the luminance value of the pixel at the corresponding location in the first picture block. The second pixel matrix is N×M, and the element at the corresponding location corresponds to the quantization step value corresponding to the luminance value of the pixel at the corresponding location in the first picture block. The fifth pixel matrix is N×M, and the element at the corresponding location corresponds to the chroma value of the pixel at the corresponding location in the first picture block. The sixth pixel matrix is N×M, and the element at the corresponding location corresponds to the quantization step value corresponding to the chroma value of the pixel at the corresponding location in the first picture block. The first pixel matrix and the second pixel matrix are combined to obtain the N×M×2 first preprocessed matrix, and the fifth pixel matrix and the sixth pixel matrix are combined to obtain the N×M×2 third preprocessed matrix. In this case, the input pixel matrix includes the first preprocessed matrix and the third preprocessed matrix. The input pixel matrix is input to the filtering network to perform a filtering operation. The output third pixel matrix is N×M, and the element at the corresponding location in the third pixel matrix may correspond to the luminance value or the luminance residual value of the pixel at the corresponding location in the second picture block. Optionally, the seventh pixel matrix or the eighth pixel matrix may be further output. An element at a corresponding location in the seventh pixel matrix corresponds to a chroma value of the pixel at the corresponding location in the second picture block. An element at a corresponding location in the eighth pixel matrix corresponds to a chroma residual value of the pixel at the corresponding location in the second picture block.

Figure 9I:
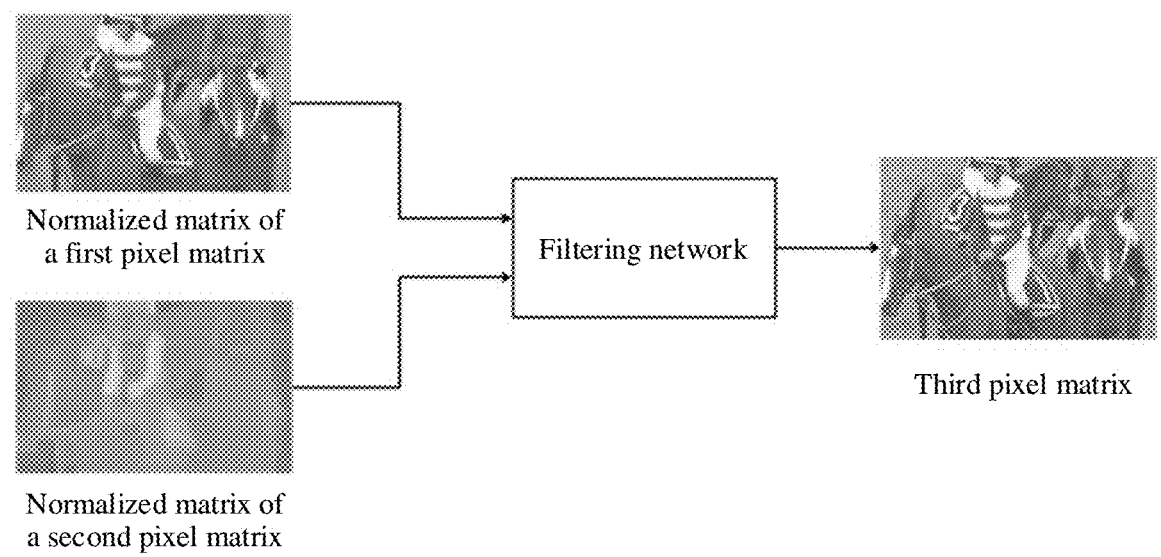

As shown in FIG. 9i, the normalized matrix of the first pixel matrix and the normalized matrix of the second pixel matrix are directly input to the filtering network. For example, the normalized matrix of the first pixel matrix is N×M, and an element at a corresponding location corresponds to a normalized value of the luminance value of the pixel at the corresponding location in the first picture block. The normalized matrix of the second pixel matrix is N×M, and an element at a corresponding location corresponds to a normalized value of the quantization step value corresponding to the luminance value of the pixel at the corresponding location in the first picture block. In this case, the input pixel matrix includes the normalized matrix of the first pixel matrix and the normalized matrix of the second pixel matrix.

Figure 9J:
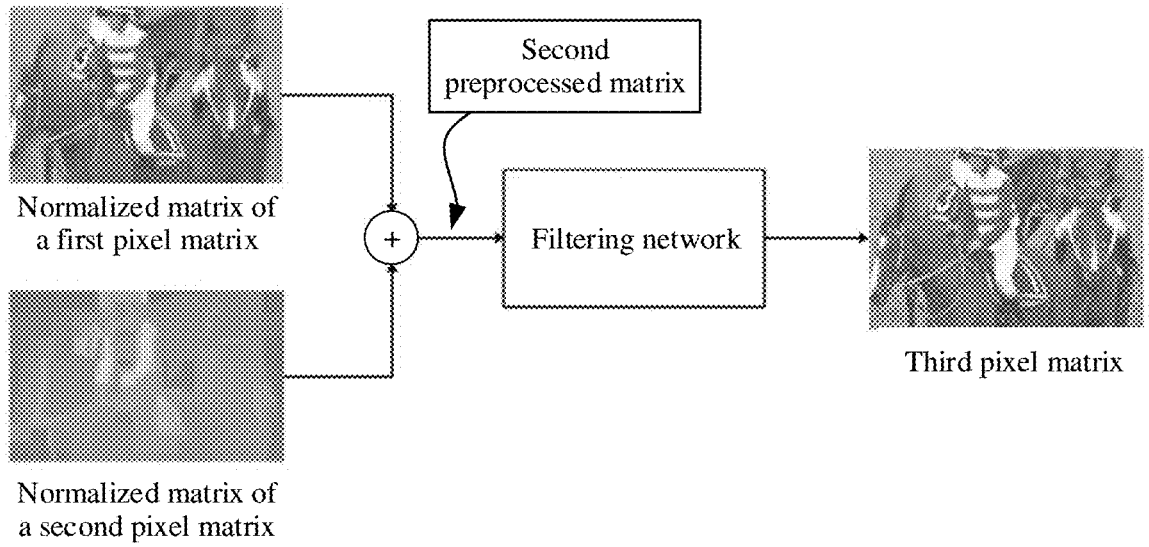

As shown in FIG. 9j, the normalized matrix of the first pixel matrix and the normalized matrix of the second pixel matrix are added and then input to the filtering network. For example, the normalized matrix of the first pixel matrix is N×M, and an element at a corresponding location corresponds to a normalized value of the luminance value of the pixel at the corresponding location in the first picture block. The normalized matrix of the second pixel matrix is N×M, and an element at a corresponding location corresponds to a normalized value of the quantization step value corresponding to the luminance value of the pixel at the corresponding location in the first picture block. Values of the elements at the corresponding locations in the normalized matrix of the first pixel matrix and the normalized matrix of the second pixel matrix are added to obtain the N×M second preprocessed matrix. In this case, the input pixel matrix is the second preprocessed matrix. The input pixel matrix is input to the filtering network to perform a filtering operation. The output third pixel matrix is N×M, and the element at the corresponding location in the third pixel matrix may correspond to a normalized value of the luminance value or the luminance residual value of the pixel at the corresponding location in the second picture block, or may correspond to the luminance value or the luminance residual value of the pixel at the corresponding location in the second picture block only after denormalization processing is performed.

Figure 9K:
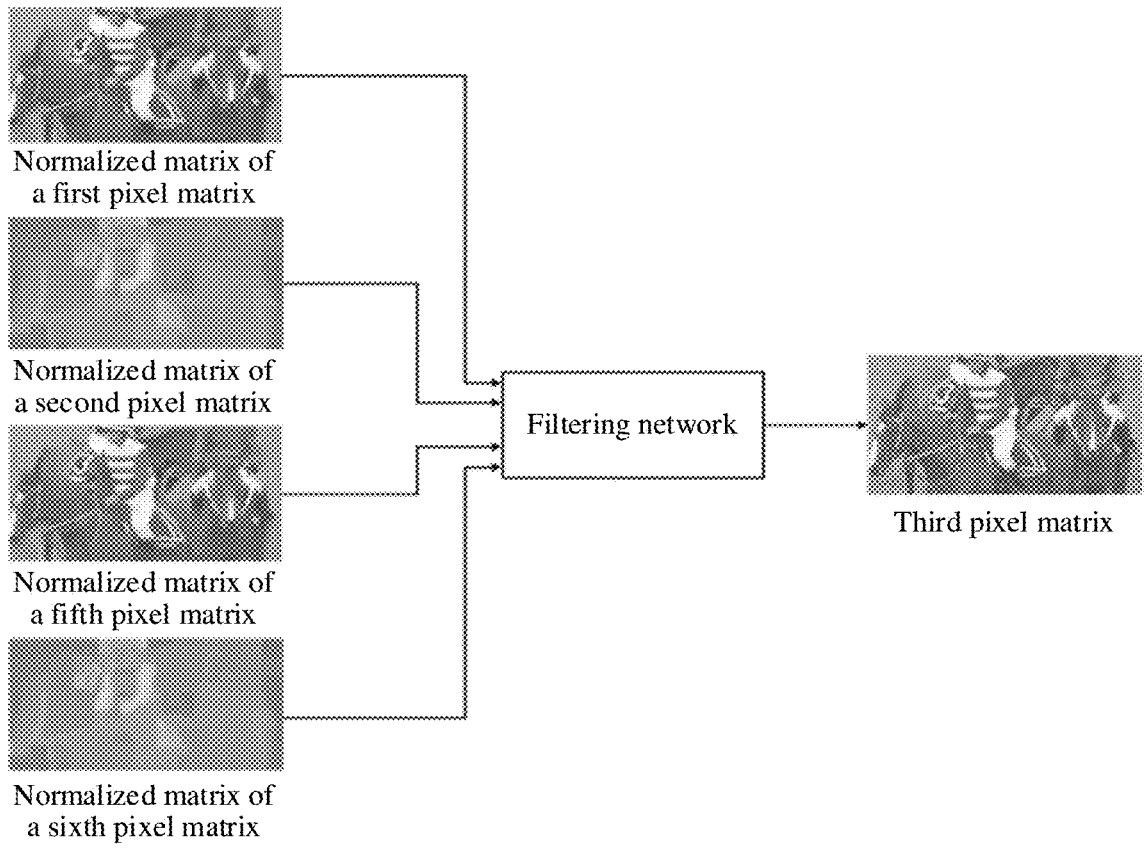
Figure 9I:
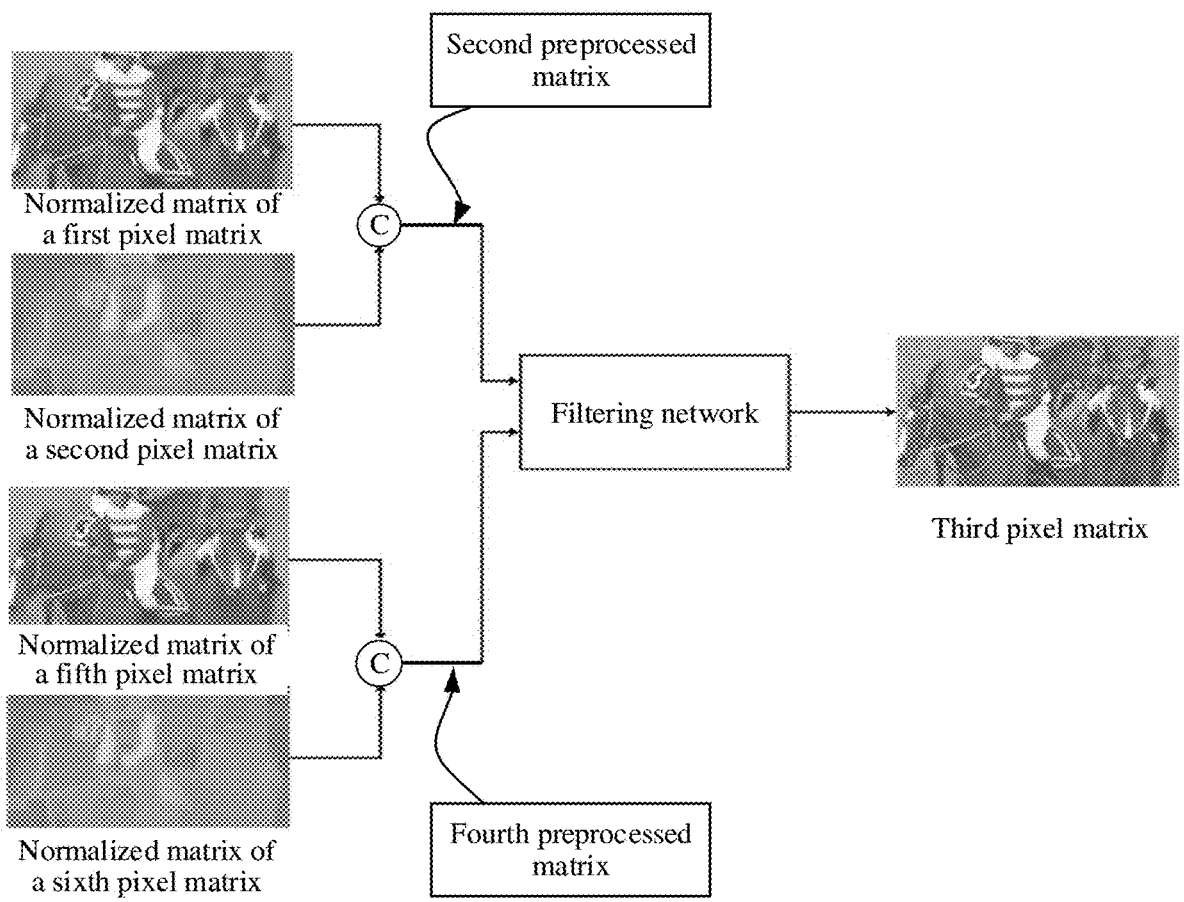

As shown in FIG. 9k, the normalized matrix of the first pixel matrix, the normalized matrix of the second pixel matrix, a normalized matrix of the fifth pixel matrix, and a normalized matrix of the sixth pixel matrix are directly input to the filtering network. For example, the normalized matrix of the first pixel matrix is N×M, and an element at a corresponding location corresponds to a normalized value of the luminance value of the pixel at the corresponding location in the first picture block. The normalized matrix of the second pixel matrix is N×M, and an element at a corresponding location corresponds to a normalized value of the quantization step value corresponding to the luminance value of the pixel at the corresponding location in the first picture block. The normalized matrix of the fifth pixel matrix is N×M, and an element at a corresponding location corresponds to a normalized value of the chroma value of the pixel at the corresponding location in the first picture block. The normalized matrix of the sixth pixel matrix is N×M, and an element at a corresponding location corresponds to a normalized value of the quantization step value corresponding to the chroma value of the pixel at the corresponding location in the first picture block. In this case, the input pixel matrix includes the normalized matrix of the first pixel matrix, the normalized matrix of the second pixel matrix, the normalized matrix of the fifth pixel matrix, and the normalized matrix of the sixth pixel matrix. The normalized matrix of the first pixel matrix, the normalized matrix of the second pixel matrix, the normalized matrix of the fifth pixel matrix, and the normalized matrix of the sixth pixel matrix are input to the filtering network to perform a filtering operation. The output third pixel matrix is N×M, and the element at the corresponding location in the third pixel matrix corresponds to a normalized value of the luminance value or the luminance residual value of the pixel at the corresponding location in the second picture block, or may correspond to the luminance value or the luminance residual value of the pixel at the corresponding location in the second picture block only after denormalization processing is performed. Optionally, the seventh pixel matrix or the eighth pixel matrix may be further output. An element at a corresponding location in the seventh pixel matrix corresponds to a normalized value of a chroma value of the pixel at the corresponding location in the second picture block. An element at a corresponding location in the eighth pixel matrix corresponds to a normalized value of a chroma residual value of the pixel at the corresponding location in the second picture block.

As shown in FIG. 9l, the normalized matrix of the first pixel matrix and the normalized matrix of the second pixel matrix are combined and then input to the filtering network, and a normalized matrix of the fifth pixel matrix and a normalized matrix of the sixth pixel matrix are combined and then input to the filtering network. For example, the normalized matrix of the first pixel matrix is N×M, and an element at a corresponding location corresponds to a normalized value of the luminance value of the pixel at the corresponding location in the first picture block. The normalized matrix of the second pixel matrix is N×M, and an element at a corresponding location corresponds to a normalized value of the quantization step value corresponding to the luminance value of the pixel at the corresponding location in the first picture block. The normalized matrix of the fifth pixel matrix is N×M, and an element at a corresponding location corresponds to a normalized value of the chroma value of the pixel at the corresponding location in the first picture block. The normalized matrix of the sixth pixel matrix is N×M, and an element at a corresponding location corresponds to a normalized value of the quantization step value corresponding to the chroma value of the pixel at the corresponding location in the first picture block. The normalized matrix of the first pixel matrix and the normalized matrix of the second pixel matrix are combined to obtain the N×M×2 second preprocessed matrix, and the normalized matrix of the fifth pixel matrix and the normalized matrix of the sixth pixel matrix are combined to obtain an N×M×2 fourth preprocessed matrix. In this case, the input pixel matrix includes the second preprocessed matrix and the fourth preprocessed matrix. The input pixel matrix is input to the filtering network to perform a filtering operation. The output third pixel matrix is N×M, and the element at the corresponding location in the third pixel matrix may correspond to a normalized value of the luminance value or the luminance residual value of the pixel at the corresponding location in the second picture block, or may correspond to the luminance value or the luminance residual value of the pixel at the corresponding location in the second picture block only after denormalization processing is performed. Optionally, the seventh pixel matrix or the eighth pixel matrix may be further output. An element at a corresponding location in the seventh pixel matrix corresponds to a normalized value of a chroma value of the pixel at the corresponding location in the second picture block. An element at a corresponding location in the eighth pixel matrix corresponds to a normalized value of a chroma residual value of the pixel at the corresponding location in the second picture block.

It should be noted that FIG. 9a to FIG. 9l show examples of data input to the filtering network. The data input to the filtering network is not specifically limited in this application, and preprocessing performed before the data enters the filtering network is not specifically limited either. The preprocessing of two pixel matrices further includes addition, multiplication, and the like. In addition, the foregoing preprocessing manner used for the pixel matrix is also implemented by the filtering network.

In this application, when the filtering network is used to implement filtering, a quantization step value of each pixel of the reconstructed picture block is introduced, so that filtering can be better guided on a pixel matrix that is input to the filtering network. Therefore, filtering effect can be improved for reconstructed pictures of various quality levels.

Figure 10:
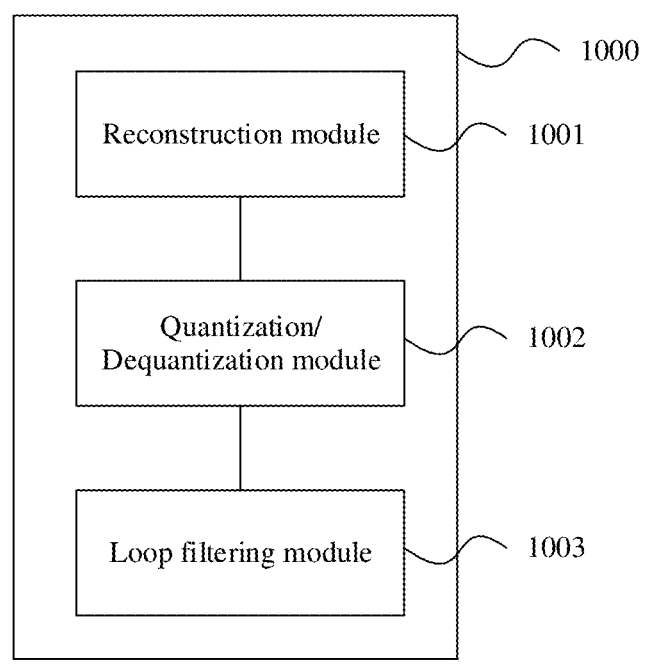
FIG. 10 is a schematic diagram of a structure of a coding apparatus 1000 according to an embodiment of this application.

FIG. 10 is a schematic diagram of a structure of a coding apparatus 1000 according to an embodiment of this application. The coding apparatus 1000 may correspond to the video encoder 20 or the video decoder 30. The coding apparatus 1000 includes a reconstruction module 1001, a quantization/dequantization module 1002, and a loop filtering module 1003. The reconstruction module 1001 is configured to obtain a first pixel matrix. The quantization/dequantization module 1002 is configured to obtain a second pixel matrix. The loop filtering module 1003 is configured to implement the method embodiment shown in FIG. 8. In an example, the reconstruction module 1001 may correspond to the reconstruction unit 214 in FIG. 2, or correspond to the reconstruction unit 314 in FIG. 3. In an example, the quantization/dequantization module 1002 may correspond to the quantization unit 208 in FIG. 2, or correspond to the inverse quantization unit 310 in FIG. 3. In an example, the loop filtering module 1003 may correspond to the loop filtering unit 220 in FIG. 2, or correspond to the loop filtering unit 320 in FIG. 3.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

Instructions may be executed by one or more processors such as one or more digital signal processors (DSPs), a general microprocessor, an application-specific integrated circuit (ASIC), a field programmable gate array (FPGA), or an equivalent integrated circuit or discrete logic circuit. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed techniques, but do not necessarily require realization by different hardware units. Actually, as described above, various units may be combined into a codec hardware unit in combination with appropriate software and/or firmware, or may be provided by interoperable hardware units (including one or more processors described above).

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A loop filtering method, comprising:
   obtaining a first pixel matrix, wherein an element at a corresponding location in the first pixel matrix corresponds to a luminance value of a pixel at a corresponding location in a first picture block, and the first picture block is a reconstructed picture block or a picture block in a reconstructed picture;
   obtaining a second pixel matrix, wherein an element at a corresponding location in the second pixel matrix corresponds to a quantization step value corresponding to the luminance value of the pixel at the corresponding location in the first picture block, and a size of the second pixel matrix is equal to a size of the first pixel matrix; and
   performing filtering processing on an input pixel matrix by using a filtering network to obtain an output pixel matrix, wherein the filtering network is a neural network that has a filtering function and is obtained through training; the output pixel matrix comprises a third pixel matrix, wherein an element at a corresponding location in the third pixel matrix corresponds to a luminance value or a luminance residual value of a pixel at a corresponding location in a second picture block, and the second picture block is obtained after filtering is performed on the first picture block; and the input pixel matrix is related to at least the first pixel matrix and the second pixel matrix,
   wherein the input pixel matrix comprises the first pixel matrix and the second pixel matrix; or
   the input pixel matrix is a first preprocessed matrix obtained by preprocessing the first pixel matrix and the second pixel matrix; or
   the input pixel matrix comprises a normalized matrix of the first pixel matrix and a normalized matrix of the second pixel matrix; or
   the input pixel matrix is a second preprocessed matrix obtained by preprocessing a normalized matrix of the first pixel matrix and a normalized matrix of the second pixel matrix.

2. The method according to claim 1, wherein the element at the corresponding location in the third pixel matrix corresponds to the luminance residual value of the pixel at the corresponding location in the second picture block, and the method further comprises:
   adding values of the elements at the corresponding locations in the first pixel matrix and the third pixel matrix to obtain a fourth pixel matrix, wherein an element at a corresponding location in the fourth pixel matrix corresponds to the luminance value of the pixel at the corresponding location in the second picture block.

3. The method according to claim 1, wherein the input pixel matrix is a normalized matrix, and the method further comprises:
performing denormalization processing on the value of the element at the corresponding location in the third pixel matrix.

4. The method according to claim 2, wherein normalization processing is performed on the input pixel matrix, and the adding values of the elements at the corresponding locations in the first pixel matrix and the third pixel matrix to obtain a fourth pixel matrix comprises:
adding the value of the element at the corresponding location in the first pixel matrix and a denormalized value of the element at the corresponding location in the third pixel matrix, to obtain the fourth pixel matrix.

5. The method according to claim 1, further comprising:
obtaining a fifth pixel matrix, wherein an element at a corresponding location in the fifth pixel matrix corresponds to a chroma value of the pixel at the corresponding location in the first picture block; and
the input pixel matrix is related to at least the first pixel matrix, the second pixel matrix, and the fifth pixel matrix.

6. The method according to claim 5, wherein the input pixel matrix comprises the first pixel matrix, the second pixel matrix, and the fifth pixel matrix; or
the input pixel matrix comprises the fifth pixel matrix and a first preprocessed matrix that is obtained by preprocessing the first pixel matrix and the second pixel matrix; or
the input pixel matrix comprises a normalized matrix of the first pixel matrix, a normalized matrix of the second pixel matrix, and a normalized matrix of the fifth pixel matrix; or
the input pixel matrix comprises a normalized matrix of the fifth pixel matrix and a second preprocessed matrix that is obtained by preprocessing the normalized matrix of the first pixel matrix and the normalized matrix of the second pixel matrix.

7. The method according to claim 6, further comprising:
obtaining a sixth pixel matrix, wherein an element at a corresponding location in the sixth pixel matrix corresponds to a quantization step value corresponding to the chroma value of the pixel at the corresponding location in the first picture block; and
the input pixel matrix is related to at least the first pixel matrix, the second pixel matrix, the fifth pixel matrix, and the sixth pixel matrix.

8. The method according to claim 7, wherein the input pixel matrix comprises the first pixel matrix; or
the input pixel matrix comprises the fifth pixel matrix, the sixth pixel matrix, and the first preprocessed matrix; or
the input pixel matrix comprises the first pixel matrix, the second pixel matrix, and a third preprocessed matrix that is obtained by preprocessing the fifth pixel matrix and the sixth pixel matrix; or
the input pixel matrix comprises the first preprocessed matrix and a third preprocessed matrix; or
the input pixel matrix comprises the normalized matrix of the first pixel matrix, the normalized matrix of the second pixel matrix, the normalized matrix of the fifth pixel matrix, and a normalized matrix of the sixth pixel matrix; or
the input pixel matrix comprises the normalized matrix of the fifth pixel matrix, a normalized matrix of the sixth pixel matrix, and the second preprocessed matrix that is obtained by preprocessing the normalized matrix of the first pixel matrix and the normalized matrix of the second pixel matrix; or
the input pixel matrix comprises the normalized matrix of the first pixel matrix, the normalized matrix of the second pixel matrix, and a fourth preprocessed matrix that is obtained by preprocessing the normalized matrix of the fifth pixel matrix and a normalized matrix of the sixth pixel matrix; or
the input pixel matrix comprises the second preprocessed matrix and a fourth preprocessed matrix.

9. The method according to claim 5, wherein the performing filtering processing on an input pixel matrix by using a filtering network to obtain an output pixel matrix comprises:
performing filtering processing on the input pixel matrix by using the filtering network to obtain the output pixel matrix, wherein the output pixel matrix comprises the third pixel matrix and a seventh pixel matrix, and an element at a corresponding location in the seventh pixel matrix corresponds to a chroma value of the pixel at the corresponding location in the second picture block.

10. The method according to claim 9, wherein the input pixel matrix is a normalized matrix, and the method further comprises:
performing denormalization processing on a value of the element at the corresponding location in the seventh pixel matrix.

11. The method according to claim 5, wherein the performing filtering processing on an input pixel matrix by using a filtering network to obtain an output pixel matrix comprises:
performing filtering processing on the input pixel matrix by using the filtering network to obtain the output pixel matrix, wherein the output pixel matrix comprises the third pixel matrix and an eighth pixel matrix, and an element at a corresponding location in the eighth pixel matrix corresponds to a chroma residual value of the pixel at the corresponding location in the second picture block; and
adding values of the elements at the corresponding locations in the fifth pixel matrix and the eighth pixel matrix to obtain a ninth pixel matrix, wherein an element at a corresponding location in the ninth pixel matrix corresponds to a chroma value of the pixel at the corresponding location in the second picture block.

12. The method according to claim 11, wherein the input pixel matrix is a normalized matrix, and the method further comprises:
performing denormalization processing on the value of the element at the corresponding location in the eighth pixel matrix; and
wherein the adding values of the elements at the corresponding locations in the fifth pixel matrix and the eighth pixel matrix to obtain a ninth pixel matrix comprises:
adding the value of the element at the corresponding location in the fifth pixel matrix and denormalized value of the element at the corresponding location in the eighth pixel matrix, to obtain the ninth pixel matrix.

13. The method according to claim 1, wherein preprocessing of two matrices comprises: adding elements at corresponding locations in the two matrices, or combining the two matrices, or multiplying elements at corresponding locations in the two matrices.

14. The method according to claim 1, further comprising:
obtaining a training matrix set, wherein the training matrix set comprises a plurality of before-filtering luminance matrices of a plurality of picture blocks, a plurality of quantization step matrices of the plurality of picture blocks, and a plurality of after-filtering luminance matrices of the plurality of picture blocks; and an element at a corresponding location in a before-filtering luminance matrix corresponds to an unfiltered luminance value of a pixel at a corresponding location in a corresponding picture block, an element at a corresponding location in a quantization step matrix corresponds to a quantization step value corresponding to a luminance value of the pixel at the corresponding location in the corresponding picture block, and an element at a corresponding location in an after-filtering luminance matrix corresponds to a filtered luminance value of the pixel at the corresponding location in the corresponding picture block; and performing training based on the training matrix set to obtain the filtering network.

15. The method according to claim 14, wherein the training matrix set further comprises a plurality of before-filtering chroma matrices of the plurality of picture blocks and a plurality of after-filtering chroma matrices of the plurality of picture blocks; and an element at a corresponding location in a before-filtering chroma matrix corresponds to an unfiltered chroma value of the pixel at the corresponding location in the corresponding picture block, and an element at a corresponding location in an after-filtering chroma matrix corresponds to a filtered chroma value of the pixel at the corresponding location in the corresponding picture block.

16. The method according to claim 1, wherein the filtering network comprises a convolutional layer and an activation layer.

17. The method according to claim 16, wherein a depth of a convolution kernel of the convolutional layer is 2, 3, 4, 5, 6, 16, 24, 32, 48, 64, or 128; and a size of the convolution kernel of the convolutional layer is 1×1, 3×3, 5×5, or 7×7.

18. The method according to claim 1, wherein the filtering network comprises a convolutional neural network (CNN), a deep neural network (DNN), or a recurrent neural network (RNN).

19. An encoder, comprising:
one or more processors; and
a non-transitory computer-readable storage medium coupled to the one or more processors and storing programming instructions for execution by the one or more processors to cause the encoder to:
obtain a first pixel matrix, wherein an element at a corresponding location in the first pixel matrix corresponds to a luminance value of a pixel at a corresponding location in a first picture block, and the first picture block is a reconstructed picture block or a picture block in a reconstructed picture;
obtain a second pixel matrix, wherein an element at a corresponding location in the second pixel matrix corresponds to a quantization step value corresponding to the luminance value of the pixel at the corresponding location in the first picture block, and a size of the second pixel matrix is equal to a size of the first pixel matrix; and
perform filtering processing on an input pixel matrix by using a filtering network to obtain an output pixel matrix, wherein the filtering network is a neural network that has a filtering function and is obtained through training; the output pixel matrix comprises a third pixel matrix, wherein an element at a corresponding location in the third pixel matrix corresponds to a luminance value or a luminance residual value of a pixel at a corresponding location in a second picture block, and the second picture block is obtained after filtering is performed on the first picture block; and the input pixel matrix is related to at least the first pixel matrix and the second pixel matrix, wherein the input pixel matrix comprises the first pixel matrix and the second pixel matrix; or the input pixel matrix is a first preprocessed matrix obtained by preprocessing the first pixel matrix and the second pixel matrix; or the input pixel matrix comprises a normalized matrix of the first pixel matrix and a normalized matrix of the second pixel matrix; or the input pixel matrix is a second preprocessed matrix obtained by preprocessing a normalized matrix of the first pixel matrix and a normalized matrix of the second pixel matrix.

20. A decoder, comprising:
one or more processors; and
a non-transitory computer-readable storage medium coupled to the one or more processors and storing programming instructions for execution by the one or more processors to cause the decoder to:
obtain a first pixel matrix, wherein an element at a corresponding location in the first pixel matrix corresponds to a luminance value of a pixel at a corresponding location in a first picture block, and the first picture block is a reconstructed picture block or a picture block in a reconstructed picture;
obtain a second pixel matrix, wherein an element at a corresponding location in the second pixel matrix corresponds to a quantization step value corresponding to the luminance value of the pixel at the corresponding location in the first picture block, and a size of the second pixel matrix is equal to a size of the first pixel matrix; and
perform filtering processing on an input pixel matrix by using a filtering network to obtain an output pixel matrix, wherein the filtering network is a neural network that has a filtering function and that is obtained through training; the output pixel matrix comprises a third pixel matrix, wherein an element at a corresponding location in the third pixel matrix corresponds to a luminance value or a luminance residual value of a pixel at a corresponding location in a second picture block, and the second picture block is obtained after filtering is performed on the first picture block; and the input pixel matrix is related to at least the first pixel matrix and the second pixel matrix, wherein the input pixel matrix comprises the first pixel matrix and the second pixel matrix; or the input pixel matrix is a first preprocessed matrix obtained by preprocessing the first pixel matrix and the second pixel matrix; or the input pixel matrix comprises a normalized matrix of the first pixel matrix and a normalized matrix of the second pixel matrix; or the input pixel matrix is a second preprocessed matrix obtained by preprocessing a normalized matrix of the first pixel matrix and a normalized matrix of the second pixel matrix.

21. A non-transitory computer-readable media storing computer instructions for loop filtering, that when executed by one or more processors, cause the one or more processors to perform operations comprising:

obtaining a first pixel matrix, wherein an element at a corresponding location in the first pixel matrix corresponds to a luminance value of a pixel at a corresponding location in a first picture block, and the first picture block is a reconstructed picture block or a picture block in a reconstructed picture;

obtaining a second pixel matrix, wherein an element at a corresponding location in the second pixel matrix corresponds to a quantization step value corresponding to the luminance value of the pixel at the corresponding location in the first picture block, and a size of the second pixel matrix is equal to a size of the first pixel matrix; and performing filtering processing on an input pixel matrix by using a filtering network to obtain an output pixel matrix, wherein the filtering network is a neural network that has a filtering function and is obtained through training, the output pixel matrix comprises a third pixel matrix, wherein an element at a corresponding location in the third pixel matrix corresponds to a luminance value or a luminance residual value of a pixel at a corresponding location in a second picture block, and the second picture block is obtained after filtering is performed on the first picture block; and the input pixel matrix is related to at least the first pixel matrix and the second pixel matrix, wherein the input pixel matrix comprises the first pixel matrix and the second pixel matrix; or the input pixel matrix is a first preprocessed matrix obtained by preprocessing the first pixel matrix and the second pixel matrix; or the input pixel matrix comprises a normalized matrix of the first pixel matrix and a normalized matrix of the second pixel matrix; or the input pixel matrix is a second preprocessed matrix obtained by preprocessing a normalized matrix of the first pixel matrix and a normalized matrix of the second pixel matrix.

* * * * *